(12) United States Patent
Nakagawa et al.

(10) Patent No.: US 8,053,140 B2
(45) Date of Patent: Nov. 8, 2011

(54) SOLID POLYMER FUEL CELL

(75) Inventors: Takashi Nakagawa, Osaka (JP);
Toshihiro Matsumoto, Osaka (JP);
Miyuki Yoshimoto, Osaka (JP); Kenji Arai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/126,327

(22) PCT Filed: Sep. 9, 2010

(86) PCT No.: PCT/JP2010/005524
§ 371 (c)(1),
(2), (4) Date: Apr. 27, 2011

(87) PCT Pub. No.: WO2011/033745
PCT Pub. Date: Mar. 24, 2011

(65) Prior Publication Data
US 2011/0207018 A1    Aug. 25, 2011

(30) Foreign Application Priority Data

Sep. 16, 2009  (JP) ................... 2009-214693
Feb. 17, 2010  (JP) ................... 2010-032619

(51) Int. Cl.
*H01M 8/02* (2006.01)
*H01M 8/04* (2006.01)
(52) U.S. Cl. ......... 429/514; 429/434; 429/457; 429/463
(58) Field of Classification Search .................. None
See application file for complete search history.

(56) References Cited

U.S. PATENT DOCUMENTS

| 2007/0178359 A1 | 8/2007 | Peng et al. |
| 2008/0070080 A1 | 3/2008 | Miyazaki |
| 2008/0107952 A1 * | 5/2008 | Farrington ............... 429/34 |
| 2009/0148738 A1 | 6/2009 | Oda et al. |

FOREIGN PATENT DOCUMENTS

| JP | 2006-172924 A | 6/2006 |
| JP | 2007-141537 A | 6/2007 |
| JP | 2007-200864 A | 8/2007 |
| JP | 2007-207731 A | 8/2007 |
| JP | 2007-317520 A | 12/2007 |

(Continued)

*Primary Examiner* — Jonathan Crepeau
(74) *Attorney, Agent, or Firm* — Greenblum & Bernstein, P.L.C.

(57) ABSTRACT

Provided is a fuel cell comprising a membrane electrode assembly, a pair of separators that sandwich the membrane electrode assembly therebetween, and a gas inlet distribution part that connects a reactive gas supply manifold hole and a reactive gas flow channel, wherein the gas inlet distribution part comprises n (n is an integer of 2 or more) distribution ribs that divide the gas inlet distribution part into a plurality of spaces, and each have a long axis perpendicular to the long axis of the linear gas flow channel and have two or more slits parallel to the long axis of the linear gas flow channel, when among the ribs, a distribution rib closest to the reactive gas supply manifold hole is defined as a first distribution rib, a distribution rib closest to the reactive gas flow channel is defined as an n-th distribution rib, and among the spaces, a space on the reactive gas supply manifold hole side from the first distribution rib is defined as a diffusion space, the cross-sectional area of the diffusion space is larger than the cross-sectional area of the slit of the first distribution rib.

15 Claims, 20 Drawing Sheets

FOREIGN PATENT DOCUMENTS

| | | |
|---|---|---|
| JP | 2008-103168 A | 5/2008 |
| JP | 2008-123750 A | 5/2008 |
| JP | 2009-4230 A | 1/2009 |
| JP | 2009-59513 A | 3/2009 |
| JP | 2009-59685 A | 3/2009 |
| JP | 2009-93850 A | 4/2009 |
| JP | 2009-140704 A | 6/2009 |

* cited by examiner

SOLID POLYMER FUEL CELL

TECHNICAL FIELD

The present invention relates to a fuel cell used for household cogeneration systems, portable power sources, power sources for electric vehicles and the like, and particularly relates to a polymer electrolyte fuel cell employing polymer electrolyte.

BACKGROUND ART

A polymer electrolyte fuel cell is composed of a polymer electrolyte membrane which selectively transports protons, and a pair of catalyst electrodes (a fuel electrode and an air electrode) which sandwich the polymer electrolyte membrane. By supplying a fuel gas (containing hydrogen gas) to the fuel electrode and supplying an oxidizing gas (containing oxygen gas) to the air electrode in the fuel cell which has the above-mentioned structure, electric energy can be continuously taken out.

The polymer electrolyte membrane is composed of an electrolyte which contains a polymer ion-exchange membrane or the like, such as a sulfonic acid group-containing fluorine resin ion-exchange membrane or hydrocarbon resin ion-exchange membrane. In order for the polymer electrolyte membrane to have an ion transport function, it needs to contain a given quantity of water.

The catalyst electrode is composed of a catalyst layer that promotes a redox reaction therein and of a gas diffusion layer having both air permeability and electric conductivity. The catalyst layer is in contact with the polymer electrolyte membrane. The catalyst layer contains as a main component carbon powder having platinum metal catalyst attached. The gas diffusion layer is composed of a carbon coat layer for improving adhesion to the catalyst layer and of a base layer through which a gas supplied from an external source is allowed to diffuse to the catalyst layer. An assembly of such a polymer electrolyte membranes and a pair of catalyst electrodes (a catalyst layer, a carbon coat layer, and a gas diffusion base material layer) is called a membrane electrode assembly (hereinafter referred to as "MEA").

For securing the MEA and for avoiding possible mixing of fuel gas and oxidizing gas supplied to the MEA, the fuel cell includes separators that sandwich the MEA.

Reaction gas channels for supplying a fuel gas to the MEA may be formed in the gas diffusion layer or other layer; however, they are typically formed in the separator's surface that contacts an MEA. The reaction gas channels are connected to a manifold hole provided in the separator. Through the reaction gas channels connected to the manifold, a reaction gas can be supplied to the catalyst electrode and a surplus non-reacted gas can be discharged. The reaction gas supplied to the reaction gas channel may be humidified beforehand.

Unit fuel cells, each consisting of an MEA and a pair of separators, are stacked on top of each other and are then sandwiched by current collectors, insulating plates and end plates to constitute a fuel cell stack, which is typically secured using fixing rods.

By supplying a hydrogen-containing fuel gas to the fuel electrode and supplying an oxygen-containing oxidizing gas to the air electrode in the fuel cell having the above-mentioned structure, the following reaction takes place whereby electric energy is generated.

First, molecules of hydrogen supplied to the fuel electrode diffuse through the fuel electrode gas diffusion layer into the catalyst layer. In the catalyst layer, each hydrogen molecule is divided into protons and electrons. Protons pass through the humidified polymer electrolyte membrane toward the air electrode. Electrons move to the air electrode through the separator contacting the MEA. The electrons moving from the fuel electrode to the air electrode may be recovered as electric energy. In the air electrode catalyst layer, the protons that came from the polymer electrolyte membrane, the electrons that came from the separator, and oxygen supplied to the air electrode react together to produce water. Water produced during power generation is used for humidifying the MEA so as to prevent membrane degradation in the MEA due to drying.

Since the reaction entails heat generation, the fuel cell generates heat during power generation. Thus, the fuel cell needs to be cooled by a coolant or the like in order to keep suitable temperature for the fuel cell. In general, in a fuel cell stack in which fuel cells are stacked on top of each other, coolant channels are provided for every 1 to 3 cells.

For improved power generation performance, the flow rate of reaction gas needs to be uniform among all reaction gas channels. By equally supplying a reaction gas to reaction gas channels, the rate of reaction that takes place in the catalyst layer becomes uniform, reducing the likelihood of variations in the current distribution and improving power generation performance.

Fuel cells are known in which separators have a gas distribution section that connects a reaction gas manifold hole and reaction gas channels in order to equally feed a reaction gas to reaction gas channels (see Patent Literatures 1 to 6).

FIG. 1 is a perspective view of gas distribution section 32 of a separator in a fuel cell disclosed by Patent Literature 1. As illustrated in FIG. 1, the separator of Patent Literature 1 includes gas distribution section 32 which connects reaction gas supply manifold hole 20 and region 11 in which reaction gas channels are formed. Gas distribution section 32 includes a plurality of convexes 31.

When gas distribution section 32, which connects reaction gas supply manifold hole 20 and region 11, has a plurality of protrusions as described above, the flow of reaction gas fed through reaction gas supply manifold hole 20 into the gas distribution section is divided into multiple streams by the protrusions, whereby the reaction gas may be equally distributed to reaction gas channels.

Techniques are also known in which a frame is used that covers the periphery of an MEA and in which a gas diffusion section is formed exclusively between the frame and the separator so as not to overlap the MEA's catalyst electrode (see Patent Literatures 7 and 8).

CITATION LIST

Patent Literature

[PTL 1] Japanese Patent Application Laid-Open No. 2007-141537
[PTL 2] Japanese Patent Application Laid-Open No. 2009-140704
[PTL 3] Japanese Patent Application Laid-Open No. 2009-059685
[PTL 4] Japanese Patent Application Laid-Open No. 2009-059513
[PTL 5] Japanese Patent Application Laid-Open No. 2008-123750
[PTL 6] Japanese Patent Application Laid-Open No. 2009-004230
[PTL 7] Japanese Patent Application Laid-Open No. 2007-317520

[PTL 8] Japanese Patent Application Laid-Open No. 2007-200864

SUMMARY OF INVENTION

Technical Problem

With a gas distribution section such as that disclosed in Patent Literature 1, however, a reaction gas cannot be distributed to reaction gas channels positioned far away from the reaction gas supply manifold hole. For this reason, a fuel cell such as that disclosed in Patent Literature 1 exhibits variations in the flow rate of reaction gas among reaction gas channels, resulting in large variations in the current distribution within the cell and reducing power generation performance.

The present invention has been accomplished to solve the problems pertinent in the art, and an object of the present invention is to provide a fuel cell in which a reaction gas from a manifold hole can be equally distributed to reaction gas channels.

Solution to Problem

The present invention relates to fuel cells given below.

[1] A polymer electrolyte fuel cell including:

a membrane electrode assembly including a polymer electrolyte membrane and a pair of catalyst electrodes sandwiching the polymer electrolyte membrane;

a pair of separators sandwiching the membrane electrode assembly, the separators each including linear reaction gas channels defined by linear channel ribs, a reaction gas supply manifold hole, and a reaction gas discharge manifold hole; and an inlet gas distribution section for connecting the reaction gas supply manifold hole and the reaction gas channels, wherein the inlet gas distribution section includes n (where n is an integer of 2 or more) distribution ribs for partitioning the inlet gas distribution section into a plurality of spaces, the distribution ribs each having a longitudinal axis perpendicular to a longitudinal axis of the linear reaction gas channels, the distribution ribs each having two or more slits provided therein, the slits being in parallel to the longitudinal axis of the linear reaction channels, when, among the distribution ribs, the distribution rib positioned closest to the reaction gas supply manifold hole is considered as a first distribution rib and the distribution rib positioned closest to the reaction gas channels as an nth distribution rib, and when, among the spaces, the space positioned between the first distribution rib and the reaction gas supply manifold hole is considered as a diffusion space, an average of sectional areas of the diffusion space, the sectional areas taken along the longitudinal axis of the reaction gas channel and along the normal to the separator's surface, is larger than a sectional area of any of the slits of the first distribution rib, the sectional area taken along the longitudinal axis of the distribution rib and along the normal to the separator's surface, and slits of an mth (where m is any integer from 1 to n−1) distribution rib are positioned at midpoints between adjacent slits of an (m+1)th distribution rib.

[2] The polymer electrolyte fuel cell according to [1], wherein the average of sectional areas of the diffusion space is not less than 0.9 times a sum of sectional areas of the slits of the first distribution rib.

[3] The polymer electrolyte fuel cell according to [1] or [2], wherein the mth distribution rib has fewer slits than the (m+1)th distribution rib.

[4] The polymer electrolyte fuel cell according to any one of [1] to [3], wherein the number of the slits of the mth distribution rib is half the number of the slits of the (m+1)th distribution rib.

[5] The polymer electrolyte fuel cell according to [4], wherein the number of the slits of the nth distribution rib is half the number of the reaction gas channels of the separator.

[6] The polymer electrolyte fuel cell according to any one of [1] to [5], further including an outlet gas distribution section for connecting the reaction gas channels and the reaction gas discharge manifold hole, wherein the reaction gas discharge manifold hole is diagonally opposite to the reaction gas discharge manifold hole, and the position of the reaction gas supply manifold hole is symmetrical to the position of the reaction gas discharge manifold hole about the center point of the separator, and the position and structure of the inlet gas distribution section are respectively symmetrical to the position and structure of the out gas distribution section about the center point of the separator.

[7] The polymer electrolyte fuel cell according to any one of [1] to [6], further including a frame for holding the membrane electrode assembly, wherein the inlet gas distribution section is provided between the separator and the frame.

[8] The polymer electrolyte fuel cell according to [7], wherein a sum of the height of the channel rib and the thickness of the membrane electrode assembly is equal to or greater than a sum of the height of the channel rib and the thickness of the frame, and the first distribution rib is the highest of all of the distribution ribs.

[9] The polymer electrolyte fuel cell according to [8], wherein distribution rib height gradually decrease from the first distribution rib toward nth distribution rib.

[10] The polymer electrolyte fuel cell according to [7], wherein a top of the distribution ribs is formed of an elastic member.

[11] The polymer electrolyte fuel cell according to any one of [1] to [10], wherein when the plurality of spaces other than the diffusion space are considered as distribution spaces, an average of sectional areas of the diffusion space is larger than an average of sectional areas of any of the distribution spaces, the sectional areas taken along the longitudinal axis of the reaction gas channel and along the normal to the separator's surface.

[12] The polymer electrolyte fuel cell according to any one of [1] to [11], wherein the separator includes a coolant supply manifold hole and linear coolant channels, the linear coolant channels formed on a rear surface opposite to a surface provided with the reaction gas channels, and the coolant supply manifold hole is adjacent to the reaction gas supply manifold hole.

[13] The polymer electrolyte fuel cell according to [12], further including an inlet coolant distribution section for connecting the coolant supply manifold hole and the coolant channels, wherein the inlet coolant distribution section includes n (where n is an integer of 2 or more) distribution ribs for partitioning the inlet coolant distribution section into a plurality of spaces, the distribution ribs each having a longitudinal axis perpendicular to a longitudinal axis of the linear coolant channels, the distribution ribs each having two or more slits provided therein, the slits being in parallel to the longitudinal axis of the linear coolant channels.

[14] The polymer electrolyte fuel cell according to any one of [1] to [13], wherein the distribution ribs of the inlet gas distribution section are formed on the separator.

[15] The polymer electrolyte fuel cell according to [7], wherein the separator includes a central part provided with the reaction gas channels, and a peripheral part surrounding the central part, the distribution ribs of the inlet gas distribution section are formed on the frame, and the peripheral part is flat.

Advantageous Effects of Invention

According to the present invention, it is possible to distribute a reaction gas, supplied from a reaction gas supply manifold hole, throughout a diffusion space extending in the direction perpendicular to reaction channels, and to equally distribute the reaction gas to the reaction gas channels. Thus, according to the present invention, it is possible to suppress variations in the current distribution within the cell and thus to provide a fuel cell that offers high power generation performance.

DESCRIPTION OF EMBODIMENTS

Figure 1:
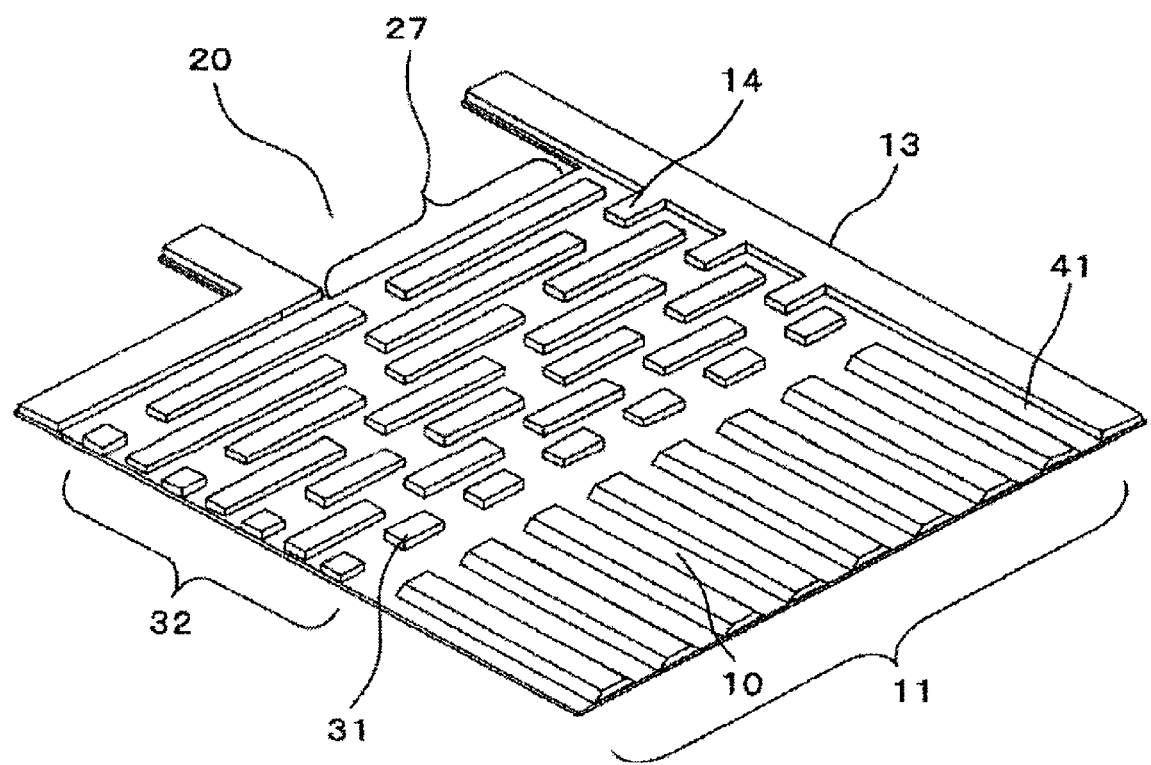
FIG. 1 is a perspective view of a separator of the conventional fuel cell disclosed by Patent Literature 1.

Each fuel cell component will be described below.

(1) Membrane Electrode Assembly

A membrane electrode assembly (MEA) includes a polymer electrolyte membrane and a pair of catalyst electrodes. The polymer electrolyte membrane is a polymer membrane which selectively transports protons in a humidified state. The material of the polymer electrolyte membrane is not particularly limited as long as the material can selectively allow protons to pass through. Examples thereof include fluorine polymer electrolyte membranes and hydrocarbon polymer electrolyte membranes. Specific examples of fluorine polymer electrolyte membranes include Nafion® membranes (DuPont), Flemion® membranes (Asahi Glass Co., Ltd.), Aciplex® membranes (Asahi Kasei Corporation), and GORE-SELECT® membranes (Japan Gore-Tex Inc.).

The pair of catalyst electrodes consists of a fuel electrode and an air electrode, which sandwich a polymer electrolyte membrane. The air electrode preferably includes an air electrode catalyst layer which contacts the polymer electrolyte membrane, and an air electrode gas diffusion layer laminated on the air electrode catalyst layer. Similarly, the fuel electrode preferably includes a fuel electrode catalyst layer which contacts the polymer electrolyte membrane, and a fuel electrode gas diffusion layer laminated on the fuel electrode catalyst layer.

The air electrode catalyst layer contains a catalyst which promotes a redox reaction of hydrogen and oxygen. The air electrode catalyst layer is not specifically limited as long as it is electrically conductive and is catalytically active for the redox reaction of hydrogen and oxygen. The air electrode catalyst layer contains as a catalyst platinum, platinum-cobalt alloy, platinum-cobalt-nickel alloy or the like.

The fuel electrode catalyst layer contains a catalyst which promotes oxidization reaction of hydrogen. The fuel electrode catalyst layer is not specifically limited as long as it is electrically conductive and is catalytically active for the oxidization reaction of hydrogen. The fuel electrode catalyst layer contains as a catalyst platinum, platinum-ruthenium alloy or the like.

The air electrode catalyst layer and fuel electrode catalyst layer are each prepared for instance by applying on a polymer electrolyte membrane a mixture of (i) carbon fine particles (e.g., acetylene black, Ketjen Black or Vulcan) supporting the corresponding catalyst, (ii) a proton conductive electrolyte, and (iii) water-repellent resin such as polytetrafluoroethylene (PTFE).

The gas diffusion layers (air electrode gas diffusion layer and fuel electrode gas diffusion layer) are conductive porous layers placed at the outermost sides of MEA and contact respective separators. The material of the gas diffusion layers is not specifically limited as long as the material is electrically conductive and is capable of diffusing a reaction gas. The gas diffusion layer may be composed of a gas diffusion base material layer that diffuses a gas supplied from the separator side to the catalyst layer, and of a carbon coat layer that improves contact between the gas diffusion layer and the catalyst layer.

The gas diffusion layer may be prepared by heat-pressing carbon fiber impregnated with water-repellent resin such as (PTFE), carbon cloth woven from carbon threads, or sheet of carbon paper, against the catalyst layer surface. Reaction gas channels (later described) may be formed in the gas diffusion layer (see Embodiment 7 and FIG. 16).

The MEA may be held by a frame. The frame reinforces the MEA by surrounding the edge of the MEA. Examples of materials of the frame include polyphenylene sulfide (PPS), glass-containing polypropylene (PP-G), polystyrene (PS) and silicone (SI), with PPS and PP-G being preferable in view of heatproof temperature, cost, and durability. Hereinafter, an MEA held by a frame may also be referred to as a "frame-integrated MEA."

(2) Separator

The separator is a member electrically connected to an MEA for preventing mixing of reaction gases each other. During power generation, electrons move from the fuel electrode to the air electrode via the separator. The separator includes a central part having thereon a plurality of linear reaction gas channels defined by ribs, and a peripheral part surrounding the central part. Hereinafter, ribs defining reaction gas channels are also referred to as "channel ribs." Each reaction gas channel is 0.5 to 1.5 mm in width and 0.3 to 1.0 mm in height. In some embodiments, reaction gas channels are formed in the MEA's gas diffusion layer, not in the separator (see Embodiment 8 and FIG. 17).

During power generation, electrons moves from the fuel electrode to the air electrode through the separator. Thus, unless the separator contacts the MEA for electrical connection, electrons cannot move to the air electrode, and therefore, electric energy cannot be taken out. For this reason, the separator is required to surely contact the MEA for electrical connection. More specifically, it is required that the top surface of channel rib of the separator contacts the MEA.

The peripheral part of the separator includes a reaction gas supply manifold hole and a reaction gas discharge manifold hole. It is preferable that the reaction gas supply manifold hole be diagonally opposite to the reaction gas discharge manifold hole, and that the position of the reaction gas supply manifold hole be symmetrical to the position of the reaction gas discharge manifold hole about the center point of the separator (see FIG. 2). The reason for this is that with this configuration, no matter what reaction gas channel a reaction gas flows through, the reaction gas travels the same distance from the reaction gas supply manifold to the reaction gas discharge manifold, making it possible to equalize pressure drop among reaction gas channels.

The peripheral part of the separator may further include a coolant supply manifold hole and a coolant discharge manifold hole. The coolant supply manifold hole is preferably adjacent to the reaction gas supply manifold hole. When the dew point of reaction gas is lower than the temperature at the time of power generation, the polymer electrolyte membrane near the reaction gas supply manifold hole dries to cause membrane resistance elevation, possibly resulting in lower fuel cell power density or degradation of the polymer electrolyte membrane. On the other hand, by positioning the coolant supply manifold hole adjacent to the reaction gas supply manifold hole, the relative humidity of the reaction gas near the reaction gas supply manifold hole can be raised, thus suppressing drying of the polymer electrolyte membrane and preventing reduction of power generation performance and degradation of the polymer electrolyte membrane.

Alternatively, the separator may include linear coolant channels on a surface of the separator, the surface being not provided with reaction gas channels (see Embodiment 3). Each coolant channel is 0.3 to 1.5 mm in width and 0.3 to 1.0 mm in depth.

The material of the separator may be carbon or metal as long as the material is electrically conductive and can endure the fastening pressure applied to a fuel cell stack. Examples of a separator made of metal (hereinafter also referred to as a "metallic separator") include stainless steel plates, titanium plates and aluminum plates, which are surface-treated (e.g., gold-plated) for imparting corrosion resistance and reducing contact resistance. Reaction gas channels may be formed by stamping of such a metallic plate.

(3) Distribution Section

The distribution section is a space formed between the MEA and separator and connecting the manifold hole and reaction gas channel. The distribution section includes n distribution ribs whose longitudinal axis is perpendicular to that of linear reaction gas channels, the distribution ribs partitioning the distribution section into a plurality of spaces. Herein, n is an integer of 2 or more. The length of the distribution section, as measured along a direction perpendicular to the longitudinal axis of the reaction gas channels, is preferably equal to or greater than the width of the central part of a separator provided with reaction gas channels (length as measured along a direction perpendicular to the longitudinal axis of the reaction gas channels) (see FIGS. 2 and 3).

The distribution section may be provided between the separator and catalyst electrode, but is preferably provided only between the separator and frame. The reason for this is that providing the distribution section between the separator and catalyst electrode results in drying of the polymer electrolyte membrane at the distribution section, facilitating degradation of the polymer electrolyte membrane.

Figure 8A:
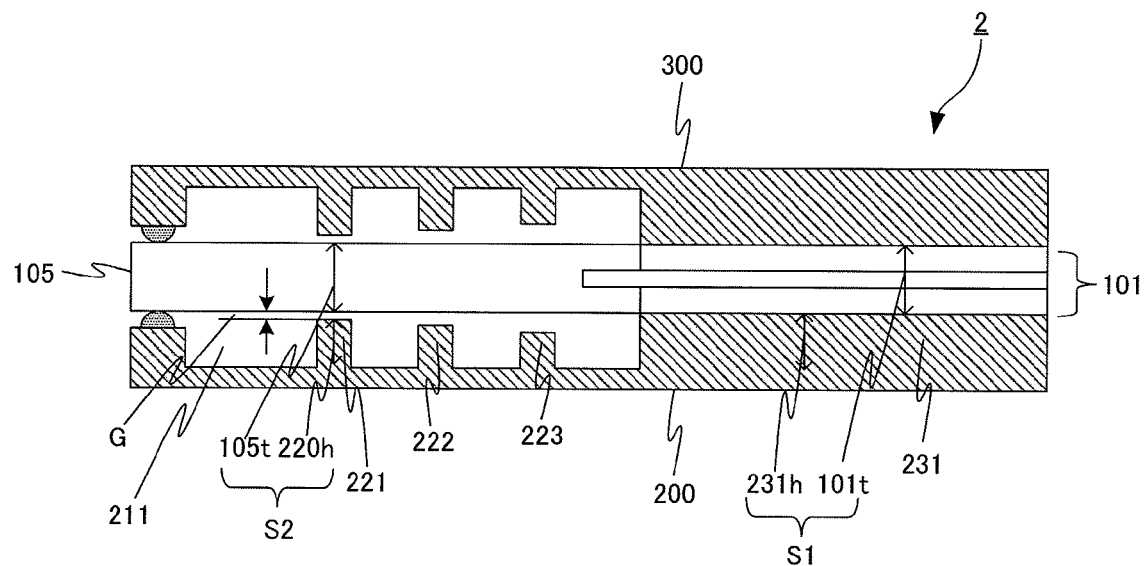
FIG. 8 is a sectional view of the fuel cell of Embodiment 2.
Figure 8B:
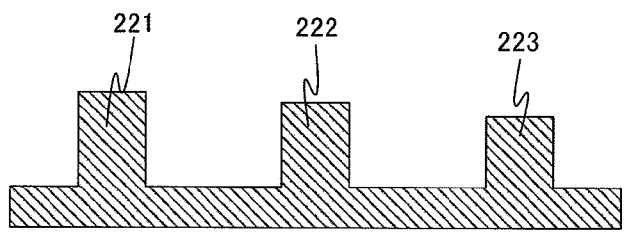
Figure 8C:
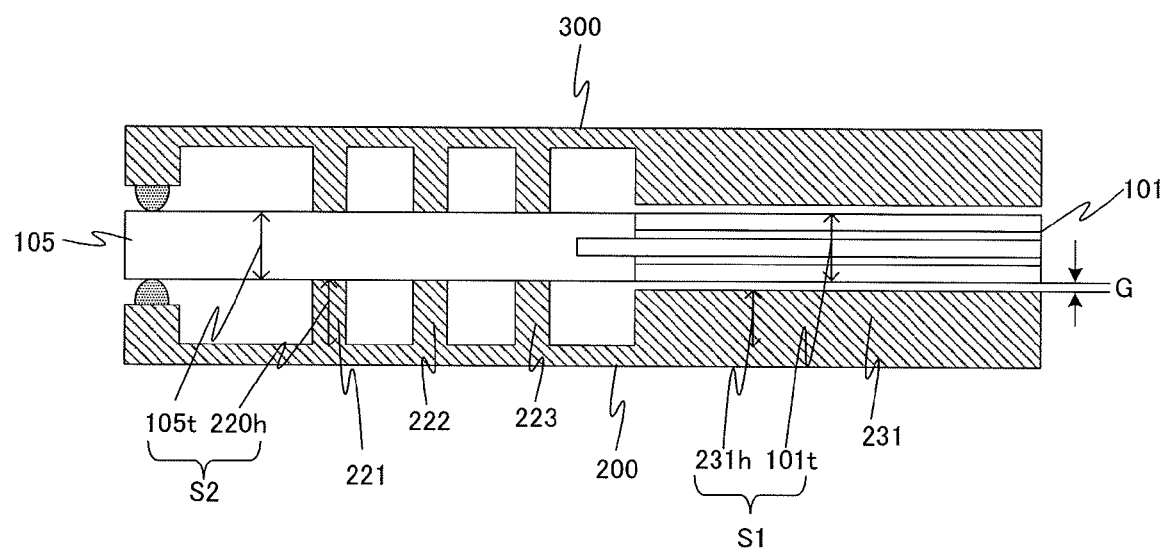

On the other hand, when the frame is too thick or distribution ribs are too high in the case where the distribution section is provided only between the separator and frame, channel ribs may not contact the catalyst electrode (see FIG. 8C). As described above, during power generation, electrons move from the fuel electrode to the air electrode via the contact surface between the separator's channel ribs and catalyst electrode. Thus, unless the channel ribs and catalyst electrode are not in contact with each other, electrons cannot move and therefore electric energy cannot be taken out. To ensure physical contact between channel ribs and catalyst electrode when the distribution section is provided only between the separator and frame, it is preferable to set a sum of the MEA thickness and channel rib height equal to or greater than a sum of the frame thickness and distribution rib height (see Embodiment 2), or to provide an elastic member on the top of the distribution ribs (see Embodiment 3), for example.

The fuel cell of the present invention includes at least a gas inlet distribution section which connects the reaction gas supply manifold hole and the central part of a separator provided with reaction gas channels. And also, the fuel cell may further include an outlet gas distribution section which connects the reaction gas discharge manifold hole and the central part of a separator provided with reaction gas channels.

The distribution ribs may be formed in the peripheral part of a separator (see Embodiments 1 to 4) or may be provided in the frame of a frame-integrated MEA (see Embodiments 6 and 7). The distribution ribs may be formed of elastic members such as sealing members (see Embodiment 3). Examples of elastic materials include silicone, ethylene-propylene-diene rubber (EPDM), and Santoprene rubber.

Distribution ribs may be formed by machining of a separator or frame itself, or may be formed by placing elastic members like sealing members onto the separator or frame. When distribution ribs are made of sealing members, the top of the distribution ribs can be formed of elastic member.

When a metallic separator is used, for example, distribution ribs can be formed by stamping of the peripheral part of the separator or by disposing sealing members on the peripheral part thereof.

Stamping enables easy formation of distribution ribs on a metallic separator, because the distribution ribs are integral with the metallic separator.

However, formation of distribution ribs by stamping of a metallic separator results in a complex concavo-convex pattern in the metallic separator, deforming the separator in some cases. Deformation of a metallic separator causes reduction in adhesion between the metallic separator and MEA, making precise patterning of diffusion space and distribution space (later described) impossible and reducing gas distribution performance.

On the other hand, when sealing members are disposed on the peripheral part of a metallic separator to form distribution ribs or when forming distribution ribs on a frame, the peripheral part of the metallic separator is made flat, and therefore, deformation of the metallic separator can be avoided. This allows for precise patterning of diffusion space and distribution space (later described), thus avoiding reduction in gas distribution performance.

A feature of the fuel cell of the present invention lies in the structure of a gas distribution section. The following describes the structures of i) inlet gas distribution section and ii) outlet gas distribution section.

i) Inlet Gas Distribution Section

The inlet gas distribution section connects a reaction gas supply manifold hole and reaction gas channels; and equally distributes a reaction gas, which has been supplied from the reaction gas supply manifold hole, to linear reaction gas channels.

The inlet gas distribution section includes n distribution ribs which partition the distribution section into multiple spaces. Here, n is an integer equal to or greater than 2. The distribution ribs have a longitudinal axis perpendicular to that of linear reaction gas channel; therefore, the multiple spaces defined by the distribution ribs likewise have a longitudinal axis perpendicular to that of the linear reaction gas channel.

The distribution ribs each have slits that are in parallel to the longitudinal axis of the linear reaction gas channels. Slits provided in the distribution ribs connect together spaces defined by the distribution ribs. Slits in each distribution rib preferably have the same dimension (width and length). Moreover, slits in each distribution rib are preferably spaced at regular intervals.

Herein, among distribution ribs, the one closest to the reaction gas supply manifold hole is called a "first distribution rib," and the one closest to the reaction gas channels is called an "nth distribution rib." Accordingly, the distribution section includes, in order from reaction gas supply manifold hole to the reaction gas channels, a first distribution rib, second distribution rib, . . . , (n−1)th rib, and nth distribution rib.

Further, in an inlet gas distribution section, space closest to the reaction gas supply manifold hole is called "diffusion space," and spaces other than the diffusion space which are defined by distribution ribs are called "distribution spaces." Specifically, distribution spaces mean spaces from the first distribution rib to the reaction gas channels. Among the distribution spaces, the space between the first and second distribution ribs is called a "first distribution space," and the space between the nth distribution and reaction gas channels is called an "nth distribution space."

Accordingly, the distribution section includes, in order from reaction gas supply manifold hole to the reaction gas channels, a diffusion space, first distribution space, second distribution space . . . , (n−1)th distribution space, and nth distribution space.

As used herein, "diffusion space" means space for allowing a reaction gas flowed into the inlet gas distribution section to diffuse in the diffusion space in the direction perpendicular to the longitudinal axis of reaction gas channels, and "distribution space" means space for equally distributing a reaction gas, diffused in the diffusion space in the direction perpendicular to the longitudinal axis of reaction gas channels, to all reaction gas channels.

The distribution ribs may have different heights. For example, the first distribution rib is preferably the highest of the all distribution ribs. Moreover, it is preferable that distribution rib height gradually decrease from the first distribution rib toward nth distribution rib (see Embodiment 2).

Slits of the mth distribution rib are provided at positions corresponding to positions between adjacent slits of the (m+1)th distribution rib. More specifically, slits of the mth distribution rib are provided at positions corresponding to the midpoints between adjacent slits of the (m+1)th distribution rib. Here, m is any integer of 1 to n−1. It is also preferable that slits of the nth distribution rib be provided at positions corresponding to positions between adjacent reaction gas channels.

The mth distribution rib has fewer slits than the (m+1)th distribution rib. Thus, the first distribution rib has the least number of slits among the distribution ribs. The first distribution rib preferably has 6 or less slits. The number of slits of the mth distribution rib is preferably half the number of slits of the (m+1)th distribution rib. Further, the number of slits of the nth distribution rib is preferably half the number of reaction gas channels of a separator.

Another feature of the present invention lies in the structure of diffusion space and distribution space. The structure of diffusion space and distribution space will be described below.

The diffusion space includes a longitudinal axis perpendicular to the longitudinal axis of the reaction gas channels. The number of the diffusion space is one. The sectional area of the diffusion space is larger than the sectional area of each slit in the first distribution rib. As used herein, "sectional area of a diffusion space" means an average of sectional areas of a diffusion space, taken along the longitudinal axis of the reaction gas channels and along the normal to the separator's surface. As used herein, "sectional area of slit" means a sectional area of slit taken along the normal to the separator's surface and along the longitudinal axis of the distribution rib.

More specifically, the diffusion space preferably has a sectional area 3 to 10 times as large as that of a slit of the first distribution rib. The sectional area of the diffusion space is preferably not less than 0.9 times the total sectional area of slits of the first distribution rib, and more preferably not less than 1 time the total sectional area of slits of the first distribution rib, The diffusion space may be widened from its longitudinal end on the side opposite to the reaction gas supply manifold hole side (hereinafter also referred to as "end A") toward its longitudinal end on the reaction gas supply manifold hole side (hereinafter also referred to as "end B"). To widen the diffusion space from end A toward end B, the diffusion space may be increased in either width (along the longitudinal axis of the reaction gas channels) (see Embodiment 4) or depth.

Because the diffusion space receives larger reaction gas than any other space, the sectional area is preferably set larger than that of any of the distribution spaces so that the pressure drop becomes smaller in the diffusion space than in any of the distribution spaces.

As used herein, "distribution space" means a space for equally distributing a reaction gas, diffused across the diffusion space along the direction perpendicular to the longitudinal axis of reaction gas channels, to the reaction gas channels. Thus, it is preferable to provide as many distribution spaces as possible in the inlet gas distribution section for high gas distribution performance. The overall pressure drop in a fuel cell, on the other hand, increases with increasing number of distribution spaces (ribs). For this reason, the number of distribution spaces is determined in light of the balance between gas distribution performance and pressure drop. For example, in a fuel cell with 200 mm×120 mm catalyst electrodes, the number of distribution spaces is 2 to 5 (i.e., n is 2 to 5).

The sectional area of the nth distribution space is preferably larger than those of the first to (n−1)th distribution spaces.

The following describes how reaction gas flows from a reaction gas supply manifold hole to reaction gas channels in a fuel cell of the present invention.

First, a reaction gas supplied from the reaction gas supply manifold hole flows into the diffusion space of the inlet gas distribution section. As described above, the sectional area of the diffusion space is larger than that of any of the slits of the first distribution rib, and more preferably, larger than the total sectional area of the slits of the first distribution rib. Thus, the pressure drop in the diffusion space is smaller than that of any of the slits of the first distribution rib, so that the reaction gas flowed into the diffusion space diffuses throughout the diffusion space before flowing into the slits of the first distribution rib. That is, the reaction gas first diffuses in the diffusion space in a direction perpendicular to the longitudinal axis of reaction gas channels.

In some cases, the reaction gas supplied to the diffusion space from the reaction gas supply manifold hole slightly leaks through slits of the first distribution rib that are positioned near the reaction gas supply manifold hole. However, by widening the diffusion space from end A toward B as described above, the pressure drop in the diffusion space near the reaction gas supply manifold hole (end A) can be further lowered. This makes it possible to prevent leakage of reaction gas through slits of the first distribution rib before the gas fills the diffusion space.

Additional inflow of a reaction gas into the diffusion space filled with reaction gas increases the reaction gas pressure inside the diffusion space, causing the reaction gas to flow into the first distribution space through slits of the first distribution rib. Since slits of each distribution rib have the same dimension as described above, the pressure drop is uniform among the slits of one distribution rib. Thus, the flow rate of reaction gas becomes uniform among all slits.

Since slits of the first distribution rib are positioned at the midpoints between adjacent slits of the second distribution rib as described above, the reaction gas passed through slits of the first distribution rib is divided into two streams after collision against the second distribution rib, and flow through adjacent slits of the second distribution rib into the second distribution space.

In this way, streams of reaction gas passed through slits of the mth distribution rib are each divided into two streams in the mth distribution space and then pass through slits of the (m+1)th distribution rib. Thus, as the reaction gas passes through distribution ribs one after another, the reaction gas is equally distributed across the width (direction perpendicular to the longitudinal axis of reaction gas channels) of the central part of the separator. Finally, the reaction gas passes through slits of the nth distribution rib into the nth distribution space.

By equalizing the flow rate of reaction gas that flows through slits of the first distribution rib and then equally distributing the reaction gas flowed through the slits of the first distribution rib in this way, the reaction gas is equally distributed across the width of the central part of the separator in the nth distribution space.

The reaction gas flowed into the nth distribution space then equally flows into reaction gas channels. Since slits of the nth distribution rib are positioned at the midpoints between adjacent reaction gas channels as described above, streams of reaction gas from the slits of the nth distribution rib are each divided into two streams and then flow into respective reaction gas channels.

Moreover, since the nth distribution space has a large sectional area as described above, the reaction gas is equally distributed to reaction gas channels even when the positions of the slits of the nth distribution and reaction gas channels are displaced from the above positions. Displacement may occur upon assembling of a fuel cell in the case where gas channels are formed in the MEA's gas diffusion layer (see Embodiment 8). Displacement of the positions of the slits of the nth distribution rib and reaction gas channels can results in variations in the flow rate of reaction gas in the reaction gas channels. However, by providing the nth distribution space having a large sectional area as in the present invention, the reaction gas passed through slits of the nth distribution rib can diffuse throughout the nth distribution space, so that the flow rate of the reaction gas becomes uniform in the nth distribution space. This corrects variations in the flow rate of reaction gas due to displacement of the positions of the slits of the nth distribution rib and reaction gas channels.

ii) Outlet Gas Distribution Section

As described above, a fuel cell of the present invention may include an outlet gas distribution section which connects reaction gas channels and a reaction gas discharge manifold hole. Preferably, the position and structure of the inlet reaction gas distribution section are respectively symmetrical to the position and structure of the outlet gas distribution section about the center point of the separator.

By providing the reaction gas supply manifold hole at a position diagonally opposite to the reaction gas discharge manifold hole so that they are symmetrical about the center point of the separator and by making the position and structure of the inlet gas distribution section respectively symmetrical to the position and structure of the outlet gas distribution section about the center point of the separator, the pressure drop can be equalized among reaction gas channels. Thus, the flow rate of reaction gas can be further uniform among all reaction gas channels.

Thus, according to the present invention, the flow rate of reaction gas can be equalized among all reaction gas channels.

With reference to the drawings, embodiments of the present invention will be described, which however shall not be construed as limiting the scope of the invention thereto.

Embodiment 1

Embodiment 1 describes a fuel cell in which metallic separators are employed. Also, Embodiment 1 describes a fuel cell in which gas distribution ribs are formed by stamping of the peripheral of the metallic separators.

Figure 2:
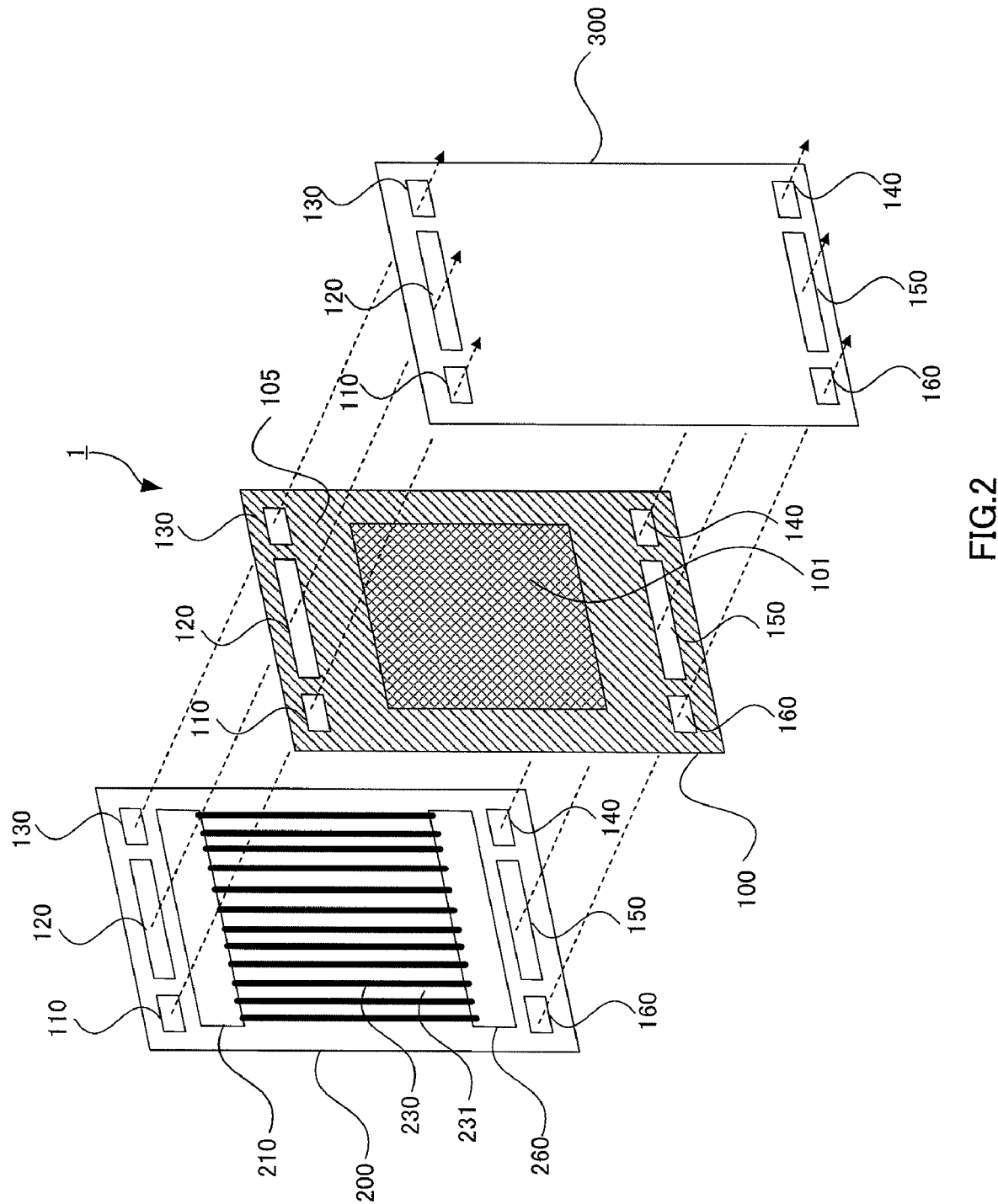
FIG. 2 is an exploded perspective view of the fuel cell of Embodiment 1.

FIG. 2 is an exploded perspective view of a fuel cell of Embodiment 1 of the present invention. As illustrated in FIG. 2, fuel cell 1 includes frame-integrated MEA 100 and a pair of separators (air electrode separator 200 and fuel electrode separator 300) sandwiching frame-integrated MEA 100.

In this embodiment, frame-integrated MEA 100 includes MEA 101 and frame 105 holding MEA 101. MEA 101 includes a polymer electrolyte membrane and a pair of catalyst electrodes sandwiching the polymer electrolyte membrane (not illustrated).

Frame 105 includes fuel gas supply manifold hole 110, fuel gas discharge manifold hole 140, oxidizing gas supply manifold hole 130, oxidizing gas discharge manifold hole 160, coolant supply manifold hole 120, and coolant discharge manifold hole 150.

Similarly, air electrode separator 200 and fuel electrode separator 300 include fuel gas supply manifold hole 110, fuel gas discharge manifold hole 140, oxidizing gas supply manifold hole 130, oxidizing gas discharge manifold hole 160, coolant supply manifold hole 120, and coolant discharge manifold hole 150 at the peripheral part.

The peripheral part of air electrode separator 200 further includes inlet oxidizing gas distribution section 210 and outlet oxidizing gas distribution section 260. Inlet oxidizing gas distribution section 210 and outlet oxidizing gas distribution section 260 overlap only frame 105, and do not overlap catalyst electrode 101. The central part of air electrode separator 200 includes oxidizing gas channels 230 defined by channel ribs 231.

Figure 4:
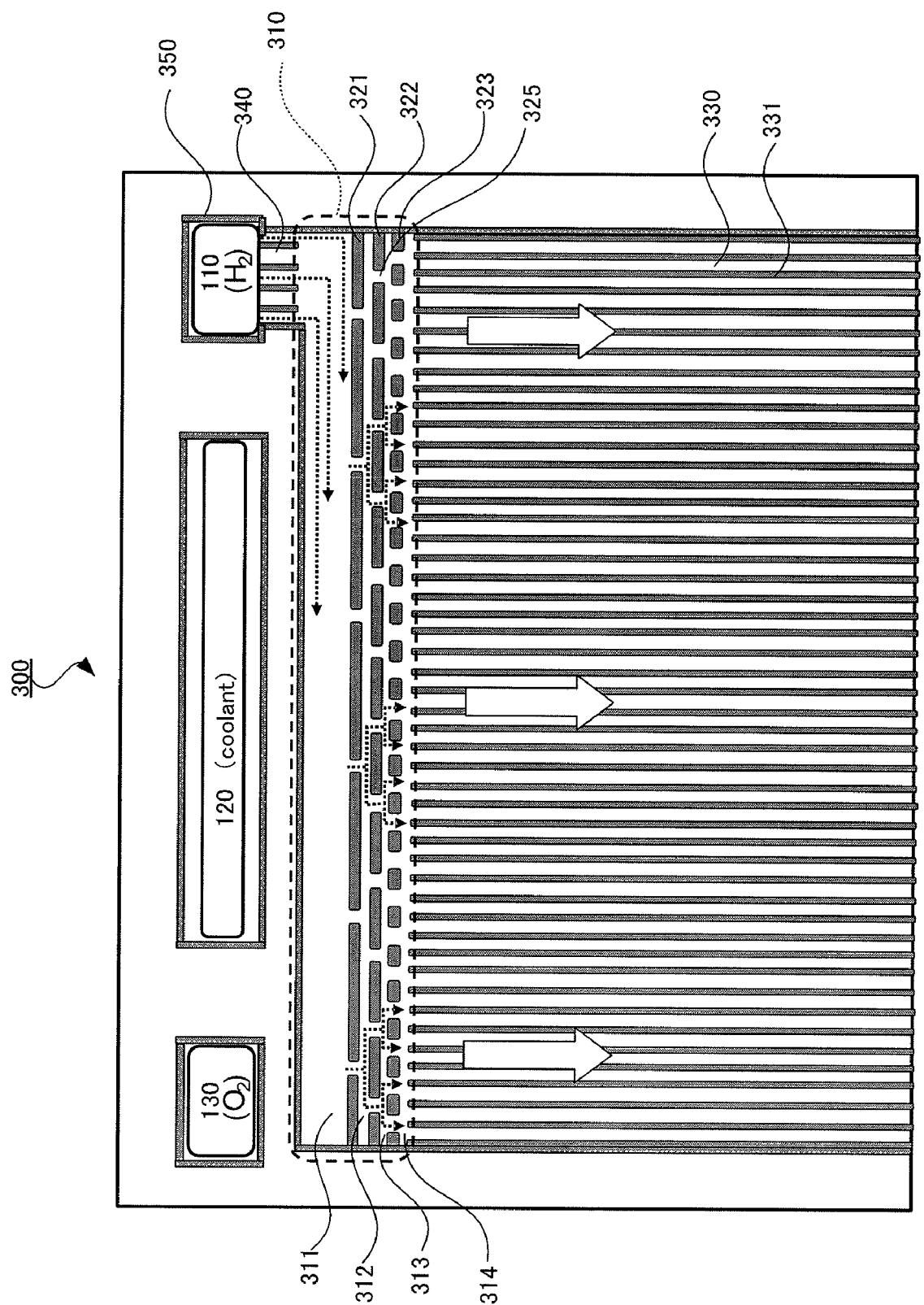
FIG. 4 illustrates a pattern of an inlet fuel gas distribution section of Embodiment 1.

The peripheral part of fuel electrode separator 300 includes inlet fuel gas distribution section 310 and outlet fuel gas distribution section 360 (not illustrated), as with air electrode separator 200 (see FIG. 4). Inlet fuel gas distribution section 310 and outlet fuel gas distribution section 360 overlap only frame 105, and do not overlap catalyst electrode 101. The central part of fuel electrode separator 300 includes fuel gas channel 330 defined by channel ribs 331 (see FIG. 4).

Fuel gas supply manifold hole 110 and oxidizing gas supply manifold hole 130 are adjacent to coolant supply manifold hole 120. Fuel gas supply manifold hole 110 is diagonally opposite to fuel gas discharge manifold hole 140, and fuel gas supply manifold hole 110 and fuel gas discharge manifold hole 140 are positioned symmetrically about the center point of the separator (or MEA). Similarly, oxidizing gas supply manifold hole 130 is diagonally opposite to oxidizing gas discharge manifold hole 160, and oxidizing gas supply manifold hole 130 and oxidizing gas discharge manifold hole 160 are positioned symmetrically about the center point of the separator (or MEA). On the other hand, coolant supply manifold hole 120 and coolant discharge manifold hole 150 are positioned on the same center line of the separator.

The position and structure of the inlet gas distribution section are respectively symmetrical to the position and structure of the outlet gas distribution section about the center point of the separator.

Air electrode separator 200 and fuel electrode separator 300 include inlet coolant distribution section 410, coolant channel 430 and outlet coolant distribution section 460 on the rear surface that does not contact MEA 100. Preferably, the position and structure of inlet coolant distribution section 410 are respectively symmetrical to the position and structure of outlet coolant distribution section 460.

1) Structure of Inlet Oxidizing Gas Distribution Section 210 of Air Electrode Separator 200

Figure 3:
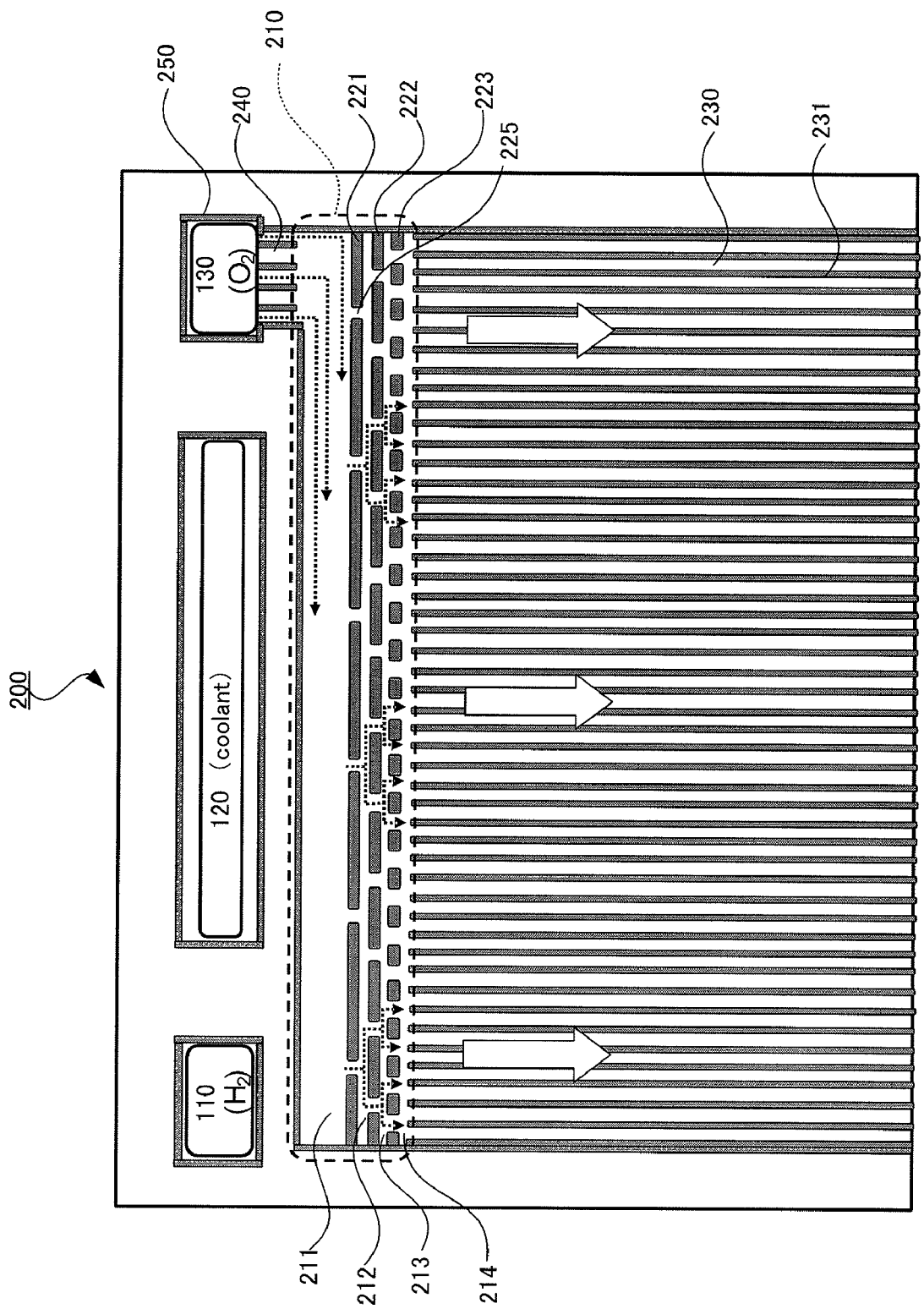
FIG. 3 illustrates a pattern of an inlet oxidizing gas distribution section of Embodiment 1.

FIG. 3 illustrates patterns of inlet oxidizing gas distribution section 210 and oxidizing gas channels 230 formed on the surface of air electrode separator 200, which surface contacts frame-integrated MEA 100. As illustrated in FIG. 3, air electrode separator 200 includes sealing member 250 which surrounds oxidizing gas supply manifold hole 130, inlet oxidizing gas distribution section 210, and oxidizing gas channel 230.

Also, as illustrated in FIG. 3, inlet oxidizing gas distribution section 210 connects oxidizing gas supply manifold hole 130 and linear oxidizing gas channels 230. Oxidizing gas supply manifold hole 130 and inlet oxidizing gas distribution section 210 are connected via channel connection section 240.

Inlet oxidizing gas distribution section 210 includes one diffusion space 211 having a longitudinal axis that is perpendicular to that of oxidizing gas channel 230; three distribution spaces having a longitudinal axis that is perpendicular to that of oxidizing gas channel 230 (first distribution space 212, second distribution space 213, and third distribution space 214); and three distribution ribs defining diffusion space 211 and distribution spaces (first distribution rib 221, second distribution rib 222, and third distribution rib 223). Each distribution rib includes slits 225 connecting adjacent distribution spaces.

First distribution rib 221 includes six slits 225 of the same size arranged at regular intervals, second distribution rib 222 includes 12 slits 225 of the same size arranged at regular intervals, and third distribution rib 223 includes 24 slits 225 of the same size arranged at regular intervals. There are provided 48 oxidizing gas channels 230.

Diffusion space 211 has a larger sectional area than any slit 225 of first distribution rib 221. For example, diffusion space 211 is 0.25 to 0.50 mm in depth and 1.0 to 10.0 mm in width, and slit 225 of first distribution rib 22 is 0.25 to 0.50 mm in depth and 0.5 to 3.0 mm in width.

Preferably, first distribution space 212 and second distribution space 213 are 0.20 to 0.50 mm in depth and 1.0 to 1.5 mm in width. Preferably, third distribution space 214 is 0.20 to 0.50 mm in depth and 1.0 to 3.5 mm in width.

Preferably, slits of second distribution rib 222 and third distribution rib 213 are 0.20 to 0.50 mm in depth and 0.2 to 1.5 mm in width. Slits of first distribution rib 221, second distribution rib 222 and third distribution rib 223 may have the same dimension (depth and width).

As illustrated in FIG. 3, slits 225 of first distribution rib 221 are positioned at the midpoints between adjacent slits 225 of second distribution rib 222, and slits 225 of second distribution rib 222 are positioned at the midpoints between adjacent slits 225 of third distribution rib 223.

The following describes how reaction gas flows into reaction gas channels 230 from oxidizing gas supply manifold hole 130. Arrows in FIG. 3 indicate flow direction of oxidizing gas.

As illustrated in FIG. 3, an oxidizing gas supplied from oxidizing gas supply manifold hole 130 first flows in diffusion space 211 of inlet oxidizing gas distribution section 210. Since diffusion space 211 has a larger sectional area than any slit 225 of first distribution rib 221 as described above, the pressure drop in diffusion space 221 is smaller than that in slit 225 of first distribution rib 221. Thus, the oxidizing gas flowed into diffusion space 211 diffuses throughout therein before flowing into slits 225 of first distribution rib 221. Specifically, the oxidizing gas first diffuses in the direction perpendicular to the longitudinal axis of oxidizing gas channels 230.

Additional inflow of an oxidizing gas into diffusion space 211 filled with oxidizing gas increases the oxidizing gas pressure inside diffusion space 211, causing the oxidizing gas to flow into first distribution space 212 through slits 225 of first distribution rib 221. As described above, slits 225 of first distribution rib 221 are of the same size and therefore have the same pressure drop. Thus, the flow rate of oxidizing gas is uniform among all slits 225.

Streams of oxidizing gas flowed through slits 225 of first distribution rib 221 into first distribution space 212 are each divided into two streams as indicated by arrows and flow through adjacent slits 225 of second distribution rib 222 into second distribution space 213. Subsequently, the streams of oxidizing gas flowed into second distribution space 213 are each divided into two streams as indicated by arrows, and flow through slits 225 of third distribution rib 223 into third distribution space 214. By equalizing the flow rate of oxidizing gas that flows through slits 225 of first distribution rib 221 and then equally distributing the oxidizing gas flowed through slits 225 of first distribution rib 221 in this way, the flow rate of oxidizing gas can be equalized across third distribution space 214 in the direction perpendicular to the longitudinal axis of oxidizing gas channels 230.

Finally, the oxidizing gas in third distribution space 214 flows into oxidizing gas channels 230. As described above, since the flow rate of oxidizing gas is uniform across third distribution space 214 in the direction perpendicular to the longitudinal axis of oxidizing gas channels 230, the flow rate of oxidizing gas can be equalized among oxidizing gas channels 230.

2) Structure of Inlet Fuel Gas Distribution Section 310 of Fuel Electrode Separator 300

FIG. 4 illustrates patterns of inlet fuel gas distribution section 310 and fuel gas channels 330 formed on the surface of fuel electrode separator 300, which surface contacts frame-integrated MEA 100. As illustrated in FIG. 4, fuel electrode separator 300 includes sealing member 350 which surrounds fuel gas supply manifold hole 110, inlet fuel gas distribution section 310, and fuel gas channel 330.

Also, as illustrated in FIG. 4, inlet fuel gas distribution section 310 connects fuel gas supply manifold hole 110 and linear oxidizing gas channels 330. Fuel gas supply manifold hole 110 and inlet fuel gas distribution section 310 are connected via channel connection section 340.

Inlet fuel gas distribution section 310 includes one diffusion space 311 having a longitudinal axis that is perpendicular to that of fuel gas channel 330; three distribution spaces having a longitudinal axis that is perpendicular to that of fuel gas channel 330 (first distribution space 312, second distribution space 313, and third distribution space 314); and three distribution ribs defining diffusion space 311 and distribution spaces (first distribution rib 321, second distribution rib 322, and third distribution rib 323). Each distribution rib includes slits 325 connecting adjacent distribution spaces.

Because the structure of inlet fuel distribution section 310 is identical to that of inlet oxidizing gas distribution section 210 of FIG. 3 as illustrated in FIG. 4, a detailed description thereof is not given.

3) Structure of Inlet Coolant Distribution Section 410

Figure 5:
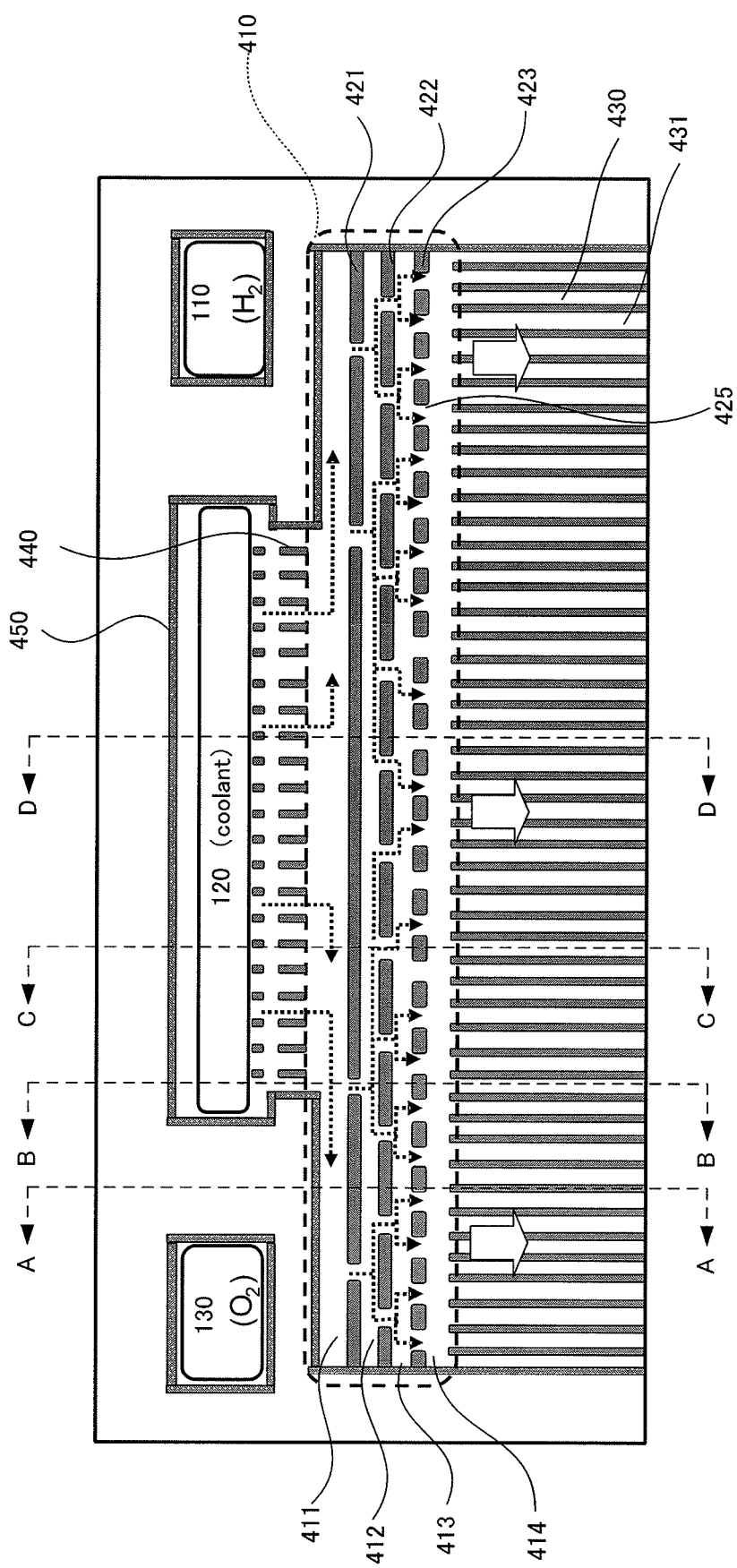
FIG. 5 illustrates a pattern of an inlet coolant distribution section of Embodiment 1.

FIG. 5 illustrates patterns of inlet coolant distribution section 410 and linear coolant channels 430, which are formed by bonding together air electrode separator 210 and fuel electrode separator 300 in a fuel cell. As illustrated in FIG. 5, coolant supply manifold hole 120, inlet coolant distribution section 410, and coolant channel 430 are surrounded by sealing member 450.

As illustrated in FIG. 5, inlet coolant distribution section 410 connects coolant supply manifold hole 120 and linear coolant channels 430. Coolant supply manifold hole 120 and inlet coolant distribution section 410 are connected via channel connection section 440.

Inlet coolant distribution section 410 includes n distribution ribs (first distribution rib 421, second distribution rib 422, and third distribution rib 423) which partition inlet coolant distribution section 410 into a plurality of spaces. Each distribution rib has a longitudinal axis perpendicular to the longitudinal axis of linear coolant channels 430, and includes two or more slits 425 parallel to the longitudinal axis of linear coolant channels 430.

Inlet coolant distribution section 410 includes three or more coolant distribution spaces (first coolant distribution space 411, second coolant distribution space 412, third coolant distribution space 413, and fourth coolant distribution space 414), each of which has a longitudinal axis perpendicular to the longitudinal axis of coolant channels 430. The coolant distribution spaces are defined by distribution ribs. Adjacent coolant distribution spaces are connected by slits 425 of distribution ribs.

First distribution rib 421 includes four slits 425, second distribution rib 422 includes 12 slits 425 of the same size arranged at regular intervals, and third distribution rib 423 includes 24 slits 425 of the same size arranged at regular intervals. There are provided 49 coolant channels 430. Since coolant channels 430 and reaction gas channels (230, 330) are like two sides of the same coin as will be described later, the number of coolant channels 430 is larger than the number of reaction gas channels (49 coolant channels 430 vs. 48 reaction gas channels).

First coolant distribution space 411 has a larger sectional area than any slit 425 of first distribution rib 421. For example, first coolant distribution space 411 is 0.50 to 1.0 mm in depth and 1.0 to 10.0 mm in width, and slit 425 of first distribution rib 421 is 0.25 to 1.0 mm in depth and 0.2 to 10 mm in width.

As illustrated in FIG. 5, first distribution rib 421 has no slit 425 at the central part. Moreover, among four slits 425 of first distribution rib 421, the two slits on the center side preferably have a larger sectional area than the other two slits on the end sides. For example, slits 425 of first distribution rib 421 on the end side may be about 0.25 mm in depth and about 2.0 mm in width, and slits 425 on the center side may be about 0.25 mm in depth and about 3.0 mm in width.

As illustrated in FIG. 5, slits 425 of first distribution rib 421 are positioned at the midpoints between adjacent slits 425 of second distribution rib 422, and slits 425 of second distribution rib 422 are positioned at the midpoints between adjacent slits 425 of third distribution rib 423.

The following describes how coolant flows from coolant supply manifold hole 120 to coolant channels 430. Arrows illustrated in FIG. 5 indicate flow direction of coolant.

As illustrated in FIG. 5, the coolant supplied from coolant supply manifold hole 120 first flows in first coolant distribution space 411 of inlet coolant distribution section 410. Since first coolant distribution space 411 has a larger sectional area than any slit 425 of first distribution rib 421 as described above, the pressure drop in diffusion space 411 is smaller than the pressure drop in slits 425 of first distribution rib 421. Thus, the coolant flowed into diffusion space 411 diffuses throughout therein before flowing into slits 425 of first distribution rib 421. Specifically, the coolant first diffuses in the direction perpendicular to the longitudinal axis of coolant channels 430.

Then, the coolant flows through slits 425 of first distribution rib 421 into second coolant distribution space 412. Streams of coolant flowed into second coolant space 412 are divided as indicated by arrows, and flow through slits 425 of second distribution rib 422 into third coolant distribution space 413. Streams of coolant flowed into third coolant space 413 are then each divided into two streams as indicated by arrows, and flow through slits 425 of third distribution rib 423 into fourth coolant distribution space 414. By distributing coolant via slits of distribution ribs in this way, the flow rate of coolant can be equalized among all coolant channels 430.

Moreover, by forming no slits 425 on the center side of first distribution rib 421 as described above, the flow rate of coolant can be further equalized among all coolant channels 430. Since coolant supply manifold hole 120 and coolant discharge manifold hole 150 are on the same center line of a separator (see FIG. 2) as described above, coolant tends to flow through coolant channels 430 positioned at the central part of the separator. Thus, if slits are formed at the central part as in the case of the first distribution rib of inlet gas distribution section (210, 310), there is concern that coolant flows only through coolant channels 430 positioned at the central part, and does not flow through those positioned at the edge.

On the other hand, when first distribution rib 421 has slits 425 on the end side only as illustrated in FIG. 5, there is concern that coolant flows only through coolant channels 430 positioned on the edge of the separator. In this embodiment, however, since slits 420 of first distribution rib 421 on the center side have a larger sectional area than slits 420 on the end side as described above, the flow rate of coolant becomes larger in slits 425 on the center side than in slits 425 on the end side, thus allowing a sufficient quantity of coolant to be supplied to coolant channels at the central part. Thus, in this embodiment, the flow rate of coolant can also be equalized among all coolant channels 430.

The function of coolant is to rid the fuel cell of generated heat so as to keep the cell's temperature constant during power generation. Accordingly, distribution of coolant needs not to be as uniform as it is for reaction gas.

4) Shapes of Fuel Electrode Separator 300 and Air Electrode Separator 200

As described above, in this embodiment, separators (200, 300) are metallic separators prepared by stamping. Thus, the separators have corresponding concavo-convex portions on both sides and have a wave-shaped section of uniform thickness. Specifically, convex portions on one side of the separator correspond to concave portions on the other side. As described above, distribution sections are all formed by stamping of the peripheral part of the metallic separators.

As described above, in this embodiment, inlet coolant distribution section 410 and coolant channel 430 are formed by bonding together air electrode separator 200 and fuel electrode separator 300. The following describes shapes of metallic separators with which inlet coolant distribution section 410 and coolant channels 430 are formed when the separators are laminated together.

Figure 6A:
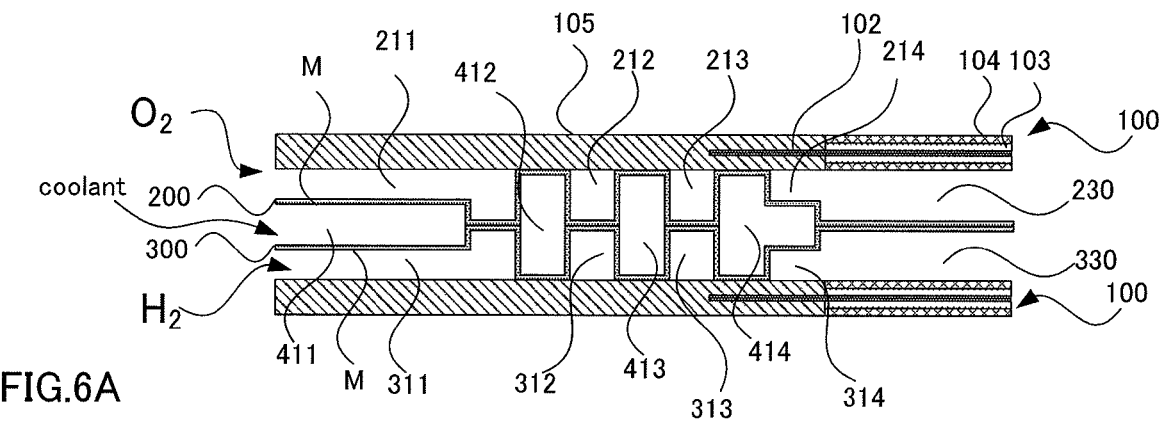
FIG. 6 is a sectional view of the fuel cell of Embodiment 1.
Figure 6B:
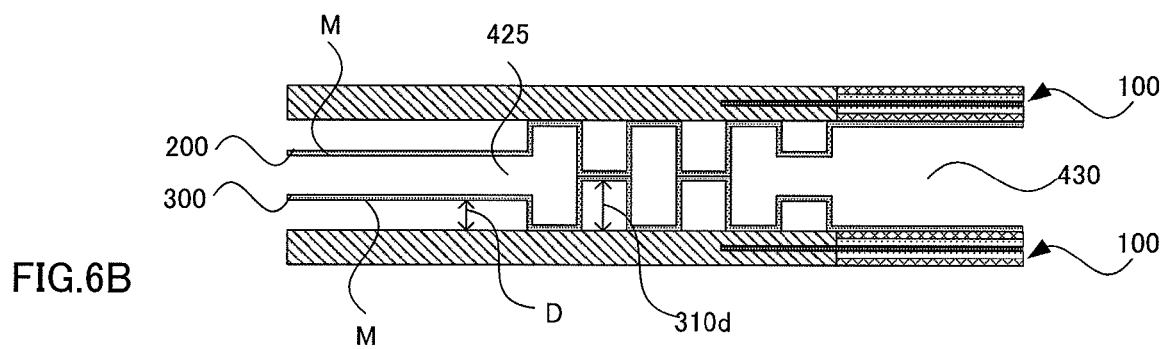
Figure 6C:
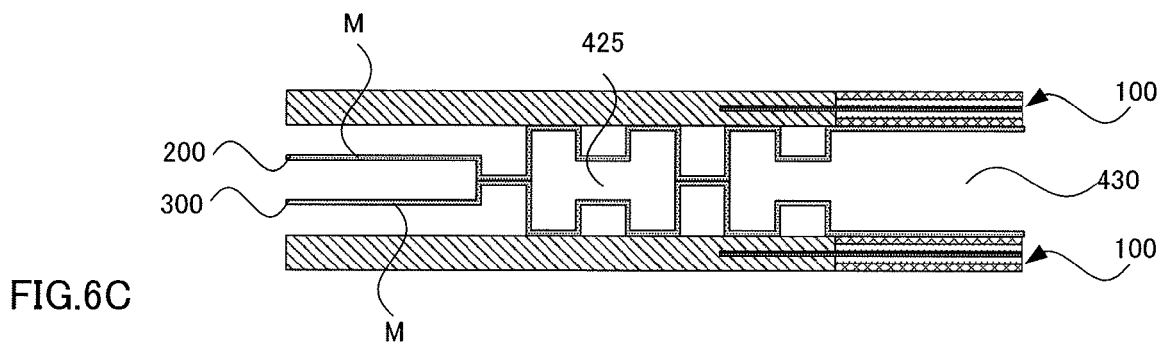
Figure 6D:
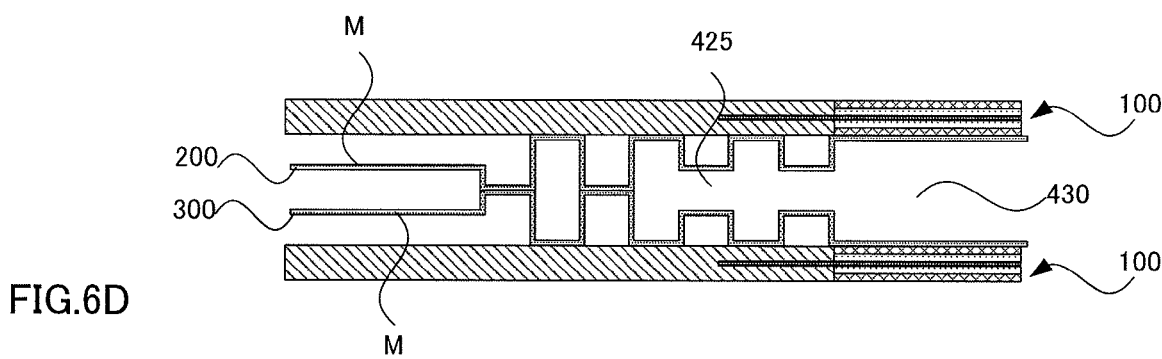

FIG. 6A is a sectional view, taken along line AA, of inlet coolant distribution section 410 and coolant channel 430 in FIG. 5; FIG. 6B is a sectional view, taken along line BB, of inlet coolant distribution section 410 and coolant channel 430 in FIG. 5; FIG. 6C is a sectional view, taken along line CC, of inlet coolant distribution section 410 and coolant channel 430 in FIG. 5; and FIG. 6D is a sectional view, taken along line DD, of inlet coolant distribution section 410 and coolant channel 430 in FIG. 5.

As illustrated in FIGS. 6A and 6B, ribs of inlet gas distribution sections (210, 310) corresponds to distribution spaces of inlet coolant distribution section 410 on the rear surface, and distribution spaces of the inlet gas distribution section corresponds to ribs of inlet coolant distribution section 410 on the rear surface. On the other hand, separators (200, 300) each include surface M of moderate height (lower than the top of rib but higher than the bottom of distribution space) (hereinafter may simply referred to as "middle surface"). For example, as illustrated in FIG. 6B, depth D of middle surface M may be approximately half depth $310d$ of the distribution space of inlet fuel gas distribution section 310. More specifically, depth D of middle surface M is about 0.25 mm, and depth $310d$ of the distribution space of inlet fuel gas distribution section 310 is about 0.5 mm.

As illustrated in FIG. 6B and FIG. 6C, slit 425 of inlet coolant distribution section 410 is formed of middle surface M. In a region corresponding to middle surface M, a distribution space of inlet oxidizing gas distribution section 210 and a distribution space of inlet fuel gas distribution section 310 are not closed.

Thus, inlet coolant distribution section 410 and coolant channel 430 can be formed by bonding together air electrode separator 200 and fuel electrode separator 300. As air electrode separator 200 and fuel electrode separator 300 have middle surface M, the pattern of the gas distribution section can be differentiated from that of the coolant distribution section.

Embodiment 2

Embodiment 2 describes a fuel cell in which a sum of MEA thickness and channel rib height is set larger than a sum of frame thickness and distribution rib height in order to ensure reliable contact between channel ribs and catalyst electrode. In this embodiment, distribution ribs are formed by curving the peripheral part of a carbon separator.

Figure 7:
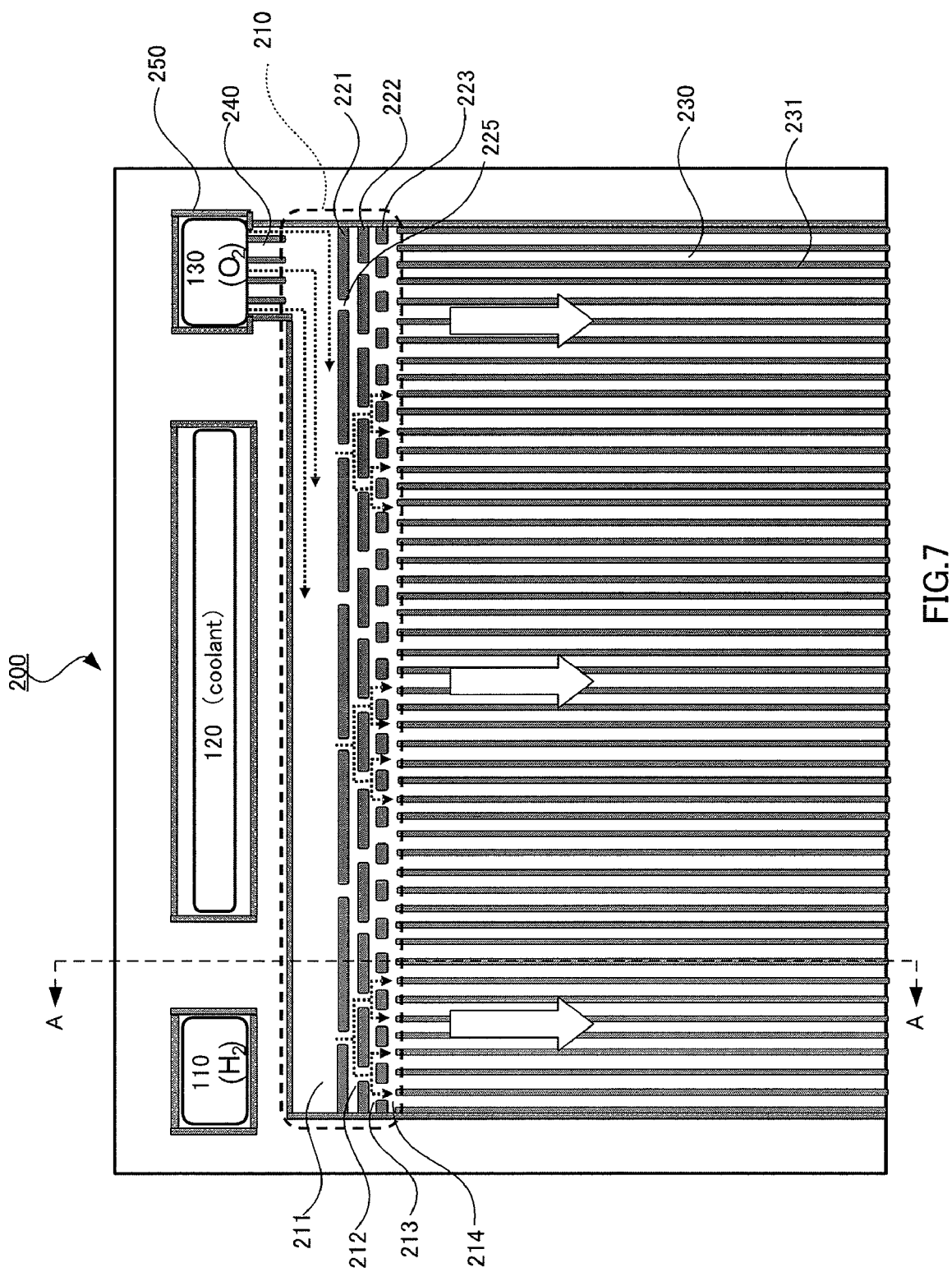
FIG. 7 illustrates a pattern of an inlet oxidizing gas distribution section of Embodiment 2.

FIG. 7 is a partial enlarged view of a surface of air electrode separator 200 of the fuel cell of Embodiment 2. The same components as those of fuel cell 1 of Embodiment 1 are given the same reference signs and descriptions are not given. As illustrated in FIG. 7, air electrode separator 200 of the fuel cell of Embodiment 2 includes inlet oxidizing gas distribution section 210 having the same pattern as in Embodiment 1.

FIG. 8A is a sectional view of fuel cell 2 of Embodiment 2, taken along line AA in FIG. 7. As illustrated in FIG. 8A, a sum of thickness $101t$ of MEA 101 and height $231h$ of channel rib 231 (hereinafter also referred to as "S1") is larger than a sum of thickness $105t$ of frame 105 and height $220h$ of distribution rib (hereinafter also referred to as "S2"). By making S1 larger than S2 in this way, channel ribs and the catalyst layer of MEA 101 are reliably in contact with each other. However, if S2 is excessively larger than S2, gap G between the distribution rib and frame 105 becomes so large that airtightness of the distribution spaces cannot be retained. For this reason, the difference between S1 and S2 is preferably 200 µm or less.

Moreover, in this embodiment, as illustrated in FIG. 8B, first distribution rib 221 is higher than any other distribution rib (second distribution rib 222 or third distribution rib 223). FIG. 8B is an enlarged view of first distribution rib 221, second distribution rib 222 and third distribution rib 223 in FIG. 8A.

In this embodiment, it is preferable that distribution rib height gradually decrease from first distribution rib 221 toward third distribution rib 223. More specifically, second distribution rib 222 is preferably 10 to 40 µm lower than first distribution rib 221, and third distribution rib 223 is preferably 40 to 86 µm lower than second distribution rib 222.

Thus, the reason for adjusting distribution rib height will be described in detail in the "Airtightness of Distribution Space" section given later.

As described above, in this embodiment, as illustrated in FIG. 8A, contact is ensured between MEA 10 and channel ribs by making S1 (sum of MEA 101 thickness and height 231h of channel rib 231) larger than S2 (sum of thickness 105t of frame 105 and height 220h of distribution rib).

On the other hand, if S1 (sum of MEA 101 thickness and height 231h of channel rib 231) is smaller than sum S2 (sum of thickness 105t of frame 105 and height 220h of distribution rib) as illustrated in FIG. 8C, gap G is created between channel ribs 231 and MEA 101, preventing channel ribs 231 from contacting MEA 101. If channel ribs 231 cannot contact MEA 101, electrons cannot move to the fuel electrode from the air electrode, and thus it becomes impossible to take out electric energy.

FIGS. 8A to 8C illustrate air electrode separator 200. Fuel electrode separator 300 has a shape similar to that of air electrode separator 200.

Airtightness of Distribution Space

By making S1 (sum of MEA thickness and channel rib height) larger than S2 (sum of frame thickness and distribution rib height) as described above, reliable contact is ensured between channel ribs and MEA; however, there is concern that a gap is created between distribution ribs and frame (see FIG. 8A).

When such a gap is created between distribution ribs and frame, it may result in failure to seal distribution spaces airtight even when a fastening pressure is applied to the fuel cell. Failure to seal distribution spaces airtight causes reduction in the gas distribution function of the gas distribution section. In particular, the gas distribution function significantly decreases when the first distribution rib failed to contact frame 105 and therefore the diffusion space was not sealed airtight.

In this embodiment, by contrast, the first distribution rib is made higher than any other distribution rib as illustrated in FIG. 8B, so that the first distribution rib reliably contacts frame 105.

Figure 9A:
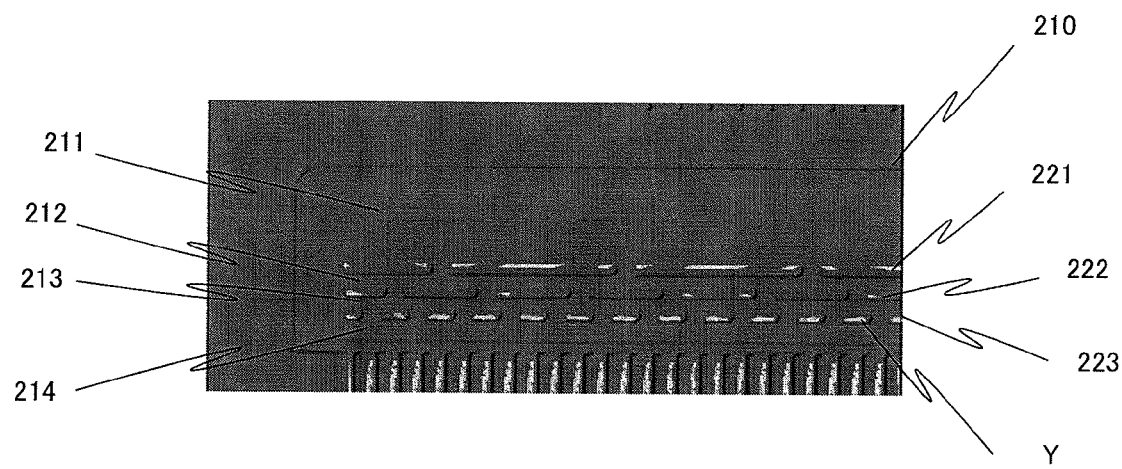
FIG. 9 illustrates a contact region between distribution ribs and a frame.

FIG. 9A illustrates contact regions between distribution rib (221, 222, 223) and frame in the fuel cell of this embodiment to which the fastening pressure (124 MPa) has been applied. White region Y on the top of a distribution rib indicates a contact region to a frame.

In inlet oxidizing gas distribution section 210 illustrated in FIG. 9A, distribution rib height gradually decrease from first distribution rib 221 toward third distribution rib 223 as illustrated in FIG. 8B. More specifically, first distribution rib is 0.25 mm in height, second distribution rib is 0.24 mm in height, and third distribution rib is 0.21 mm in height.

By gradually reducing distribution rib height from first distribution rib 221 toward third distribution rib 223 as illustrated in FIG. 9A, all of first distribution rib 221, second distribution rib 222 and third distribution rib 223 contact a frame. Thus, in this embodiment, all of first distribution rib 221, second distribution rib 222 and third distribution rib 223 contact a frame, whereby distribution spaces are sealed airtight and thereby the gas distribution function of the distribution section gas is ensured.

Figure 9B:
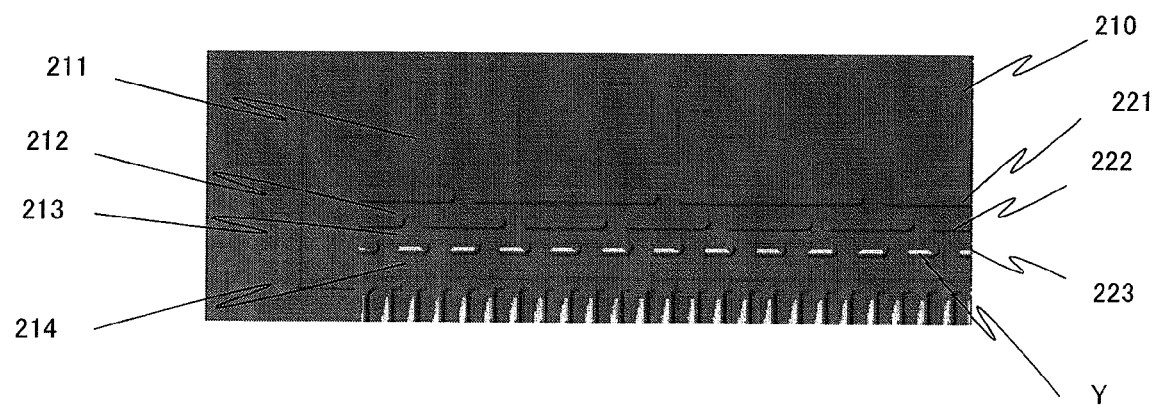

On the other hand, FIG. 9B illustrates contact regions between distribution rib and frame 105 when distribution ribs (221, 222, 223) are of the same height. When all of the distribution ribs have the same height, as illustrated in FIG. 9B, only third distribution rib 223 contacts the frame, and therefore, diffusion space 211 is not sealed airtight, causing significant reduction in the gas distribution function.

Figure 9C:
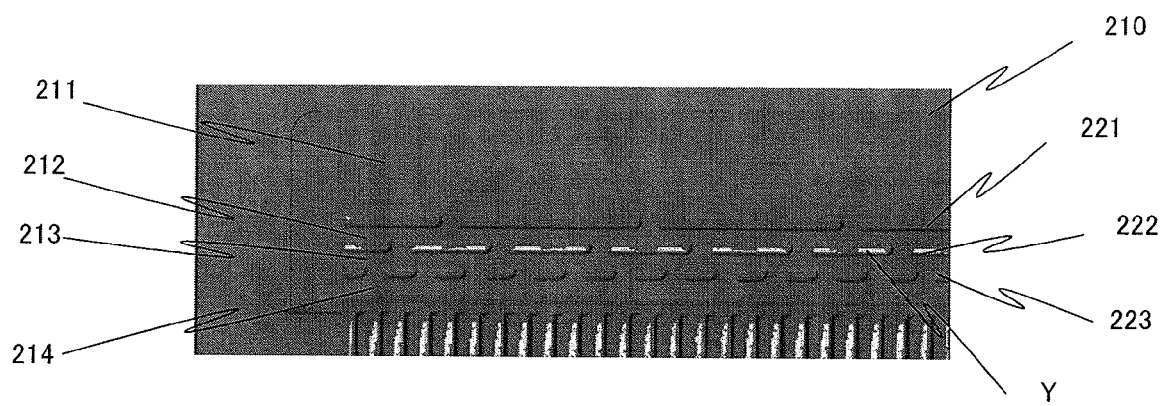

FIG. 9C illustrates contact regions between distribution rib and frame 105 when first distribution rib 221 and second distribution rib 222 are of the same height. In distribution section 210 illustrated in FIG. 9C, first distribution rib is 0.25 mm in height, second distribution rib is 0.25 mm in height, and third distribution rib is 0.21 mm in height.

When first distribution rib 221 and second distribution rib 222 have the same height, as illustrated in FIG. 9C, only second distribution rib 222 contacts the frame, and therefore, diffusion space 211 is not sealed airtight, causing significant reduction in the gas distribution function.

By making the first distribution rib higher than any other distribution rib in this way, it is possible to ensure reliable contact between the first distribution rib and frame and, therefore, gas distribution function of the distribution section.

Embodiment 3

Embodiment 2 describes a fuel cell in which reliable contact is ensured between channel ribs and MEA by making a sum of MEA thickness and channel rib height larger than a sum of frame thickness and distribution rib height. Embodiment 3 describes a fuel cell in which reliable contact is ensured between channel ribs and MEA by providing an elastic member on the top of distribution ribs.

Figure 10A:
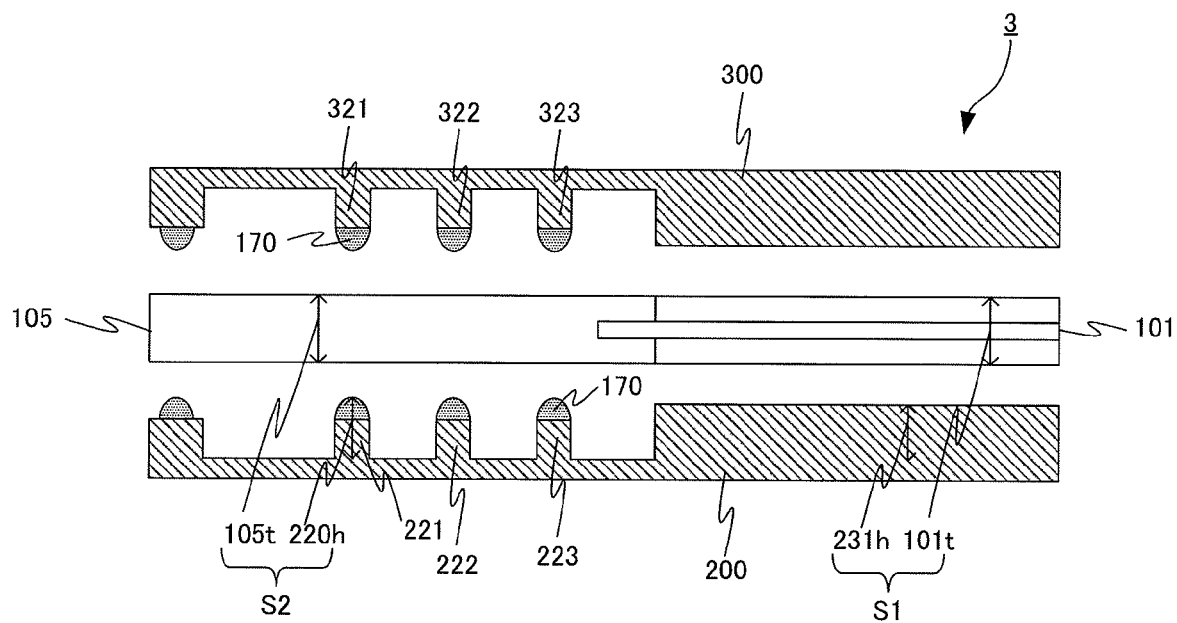
FIG. 10 is a sectional view of the fuel cell of Embodiment 3.

FIG. 10A is an exploded sectional view of fuel cell 3 of Embodiment 3. Fuel cell 3 illustrated in FIG. 10A is identical to fuel cell 2 of Embodiment 2 illustrated in FIG. 8A except for the structure of distribution ribs. The same components as those of fuel cell 2 of Embodiment 2 are given the same reference signs and descriptions are not given.

As illustrated in FIG. 10A, in fuel cell 3 of Embodiment 3, the top of distribution ribs is made of elastic member 170. Unlike Embodiment 2, in this embodiment, S1 (sum of thickness 101t of MEA and height 231h of channel rib) may be equal to or less than S2 (sum of thickness 105t of frame and height 220h of distribution rib). Moreover, all of the distribution ribs may have the same height.

Figure 10B:
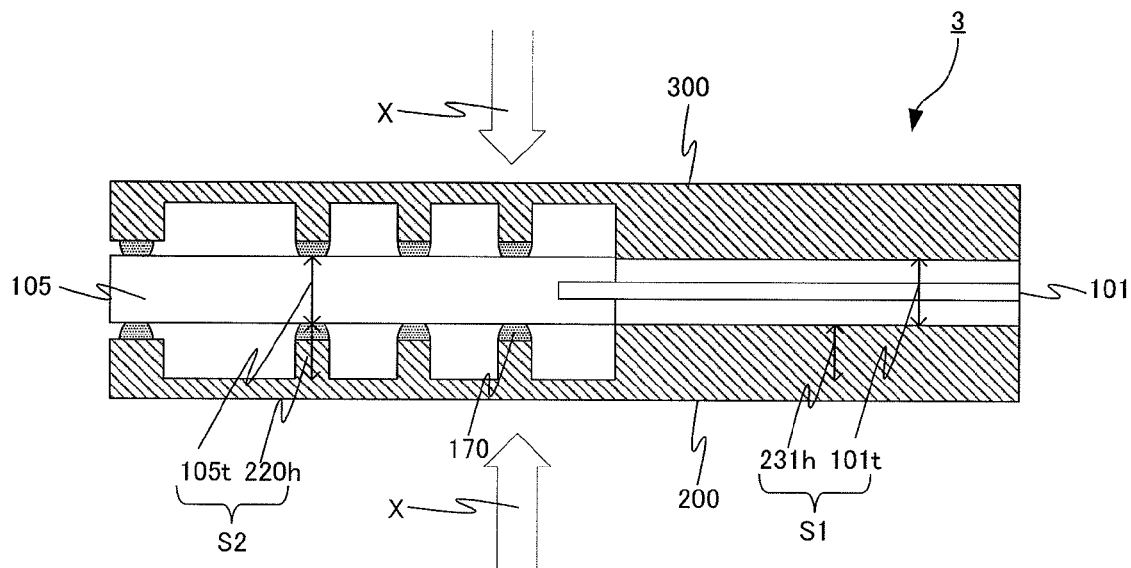

FIG. 10B illustrates fuel cell 2 of FIG. 10A after application of fastening force thereto. As illustrated in FIG. 10B, application of fastening force in the directions indicated by arrow X allows elastic members 170 to contact the frame, whereby elastic members 170 become flattened. As elastic members 170 become flattened, height 220h of distribution rib decreases, and therefore, S1 (sum of thickness 101t of MEA and height 231h of channel rib) becomes larger than S2 (sum of thickness 105t of frame and height 220h of distribution rib). This allows MEA 101 and channel ribs 231 to contact each other. Moreover, since the distribution ribs can also reliably contact frame 103, distribution spaces can be reliably sealed airtight.

Figure 10C:
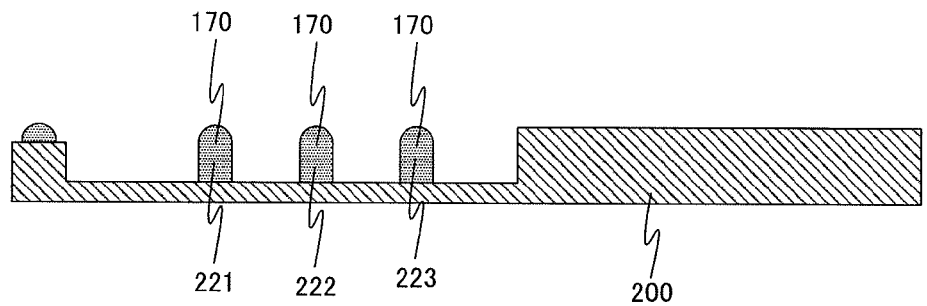

FIGS. 10A and 10B illustrate an example in which each distribution rib consists of a protrusion formed by molding of a separator and of an elastic member disposed on the top of the protrusion. However, as illustrated in FIG. 10C, the distribution ribs may be made only of elastic members 170 directly disposed on the separator.

Embodiment 4

Embodiment 4 describes a fuel cell in which the width of the diffusion space changes along its longitudinal axis.

Figure 11:
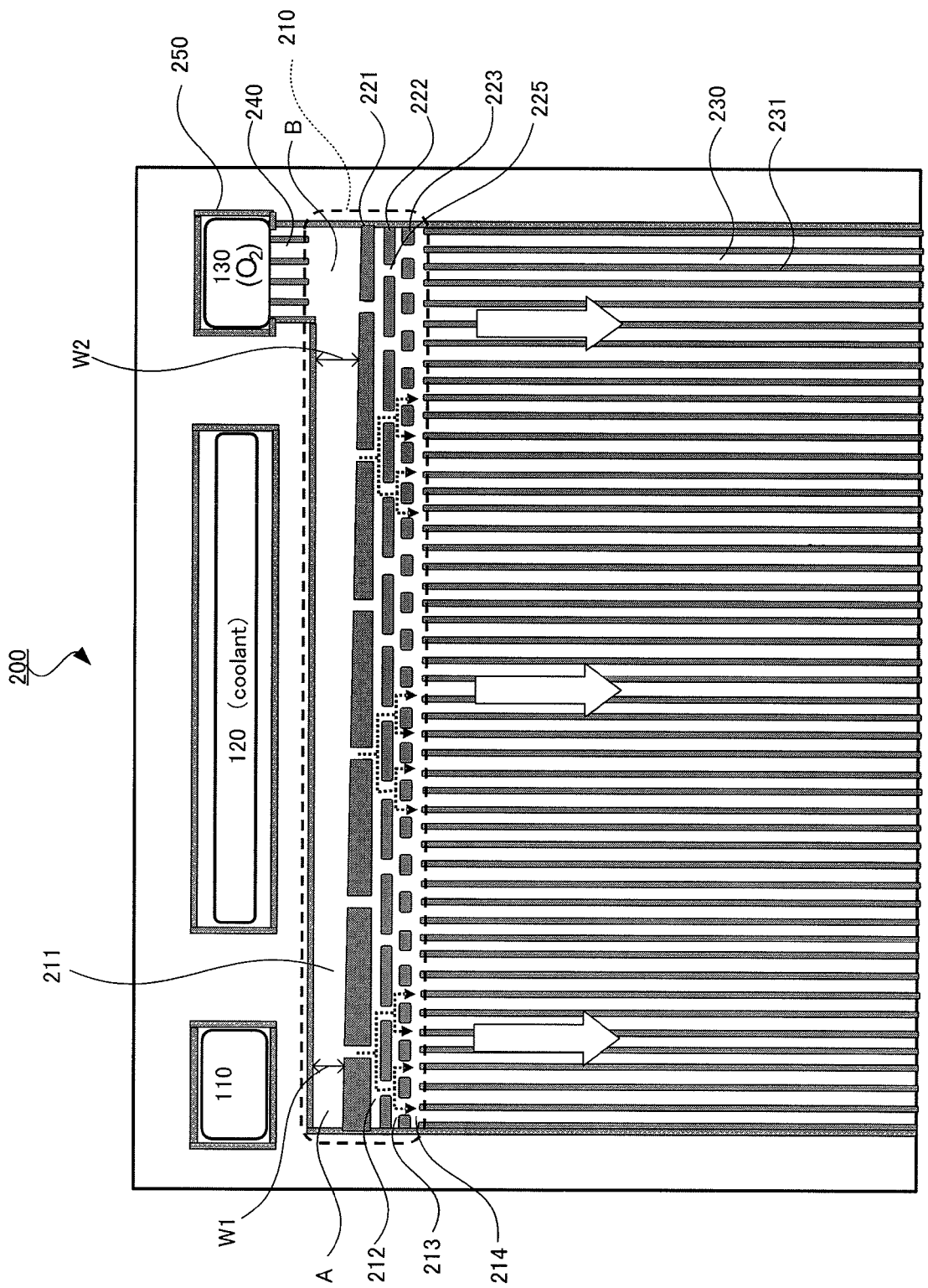
FIG. 11 illustrates a pattern of an inlet oxidizing gas distribution section of Embodiment 4.

FIG. 11 is a partial enlarged view of a surface of air electrode separator 200 of fuel cell 4 of Embodiment 4. The same components as those of fuel cell 1 of Embodiment 1 are given the same reference signs and descriptions are not given.

As illustrated in FIG. 11, in this embodiment, diffusion space 211 is gradually widened from longitudinal end A toward longitudinal end B. Longitudinal end A is the end opposite from where oxidizing gas supply manifold hole 210 is provided, and end B is the end on oxidizing gas supply manifold hole 210 side. Accordingly, width W2 near end B of diffusion space 211 is wider than width W1 near end A.

By widening the diffusion space from end A toward end B in this way, the pressure drop in the diffusion space in the vicinity of the reaction gas supply manifold hole can be further lowered, thus avoiding flowing of reaction gas through slits of the first distribution rib before the gas completely fills the diffusion space.

Embodiment 5

Embodiments 1 to 4 describes fuel cells in which the gas distribution section includes three or more distribution spaces and two or more distribution ribs. Embodiment 5 describes a fuel cell in which the gas distribution section includes a single distribution rib.

The fuel cell of Embodiment 5 is identical to fuel cell 1 of Embodiment 1 except that the gas distribution section has a different pattern. Thus, Embodiment 5 merely describes a pattern of the gas distribution section.

Figure 12:
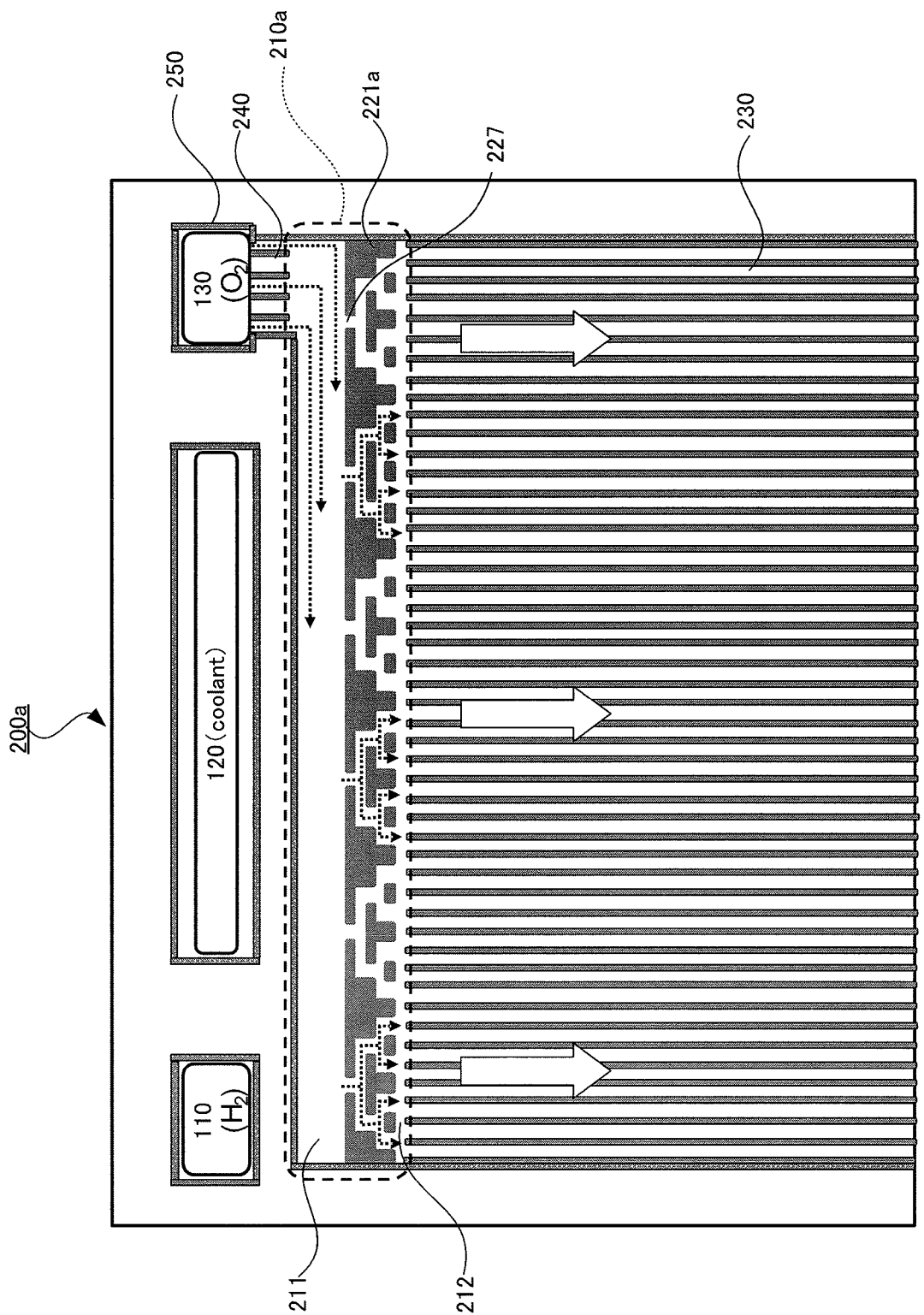
FIG. 12 illustrates a pattern of an inlet oxidizing gas distribution section of Embodiment 5.

1) Structure of Inlet Oxidizing Gas Distribution Section 210a of Air Electrode Separator 200a FIG. 12 illustrates patterns of inlet oxidizing gas distribution section 210a and oxidizing gas channels 230 formed on the surface of air electrode separator 200a, which surface contacts MEA.

The same components as those of the air electrode separator of Embodiment 1 are given the same reference signs and descriptions are not given.

As illustrated in FIG. 12, inlet oxidizing gas distribution section 210a connects oxidizing gas supply manifold hole 130 and linear oxidizing gas channels 230. Oxidizing gas supply manifold hole 130 and inlet oxidizing gas distribution section 210a are connected via channel connection section 240.

Inlet oxidizing gas distribution section 210a includes one distribution rib 221a whose longitudinal axis is perpendicular to the longitudinal axis of oxidizing gas channels 230. Distribution rib 221a partitions inlet oxidizing gas distribution section 210a into two spaces: diffusion space 211 on oxidizing gas supply manifold hole 130 side, and distribution space 212 on oxidizing gas channel 230 side.

Distribution rib 221a includes two or more (six) distribution channels 227 which connect diffusion space 211 and distribution space 212. Each distribution channel 227 is branched like a tournament table, beginning from oxidizing gas supply manifold hole 130 side to oxidizing gas channel 230 side. Preferably, all distribution channels 227 have the same dimension.

Diffusion space 211 has a larger sectional area than any distribution channel 227. For example, diffusion space 211 is 0.25 to 0.50 mm in depth and 1.0 to 10.0 mm in width, and distribution channel 227 of first distribution rib 221 is 0.25 to 0.50 mm in depth and 0.5 to 3.0 mm in width.

The following describes how oxidizing gas flows from oxidizing gas supply manifold hole 130 to oxidizing gas channels 230. Arrows in FIG. 12 indicate flow direction of oxidizing gas.

As illustrated in FIG. 12, an oxidizing gas supplied from oxidizing gas supply manifold hole 130 first flows in diffusion space 211 of inlet oxidizing gas distribution section 210a. Since diffusion space 211 has a larger sectional area than any distribution channel 227 as described above, the pressure drop in diffusion space 211 is smaller than the pressure drop in distribution channel 227. Thus, the oxidizing gas flowed into diffusion space 211 diffuses throughout diffusion space 211 before flowing into distribution channels 227. That is, the oxidizing gas first diffuses in the direction perpendicular to the longitudinal axis of oxidizing gas channels 230.

Additional inflow of an oxidizing gas into diffusion space 211 filled with oxidizing gas increases the oxidizing gas pressure inside diffusion space 211, causing the oxidizing gas to flow into distribution channels 227. Since the six distribution channels 227 have the same dimension and therefore have the same pressure drop, the flow rate of oxidizing gas is uniform among all distribution channels 227.

Oxidizing gas flows through tournament table-like branches of distribution channels 227 so as to be equally distributed in the direction perpendicular to the longitudinal axis of oxidizing gas channels 230, and flows into distribution space 212.

By equalizing the flow rate of oxidizing gas that flows into distribution channels 227 and equally distributing the oxidizing gas by means of distribution channels 226 in this way, the flow rate of oxidizing gas in first distribution space 212 becomes uniform in the direction perpendicular to the longitudinal axis of oxidizing gas channels 230.

The oxidizing gas in first distribution space 212 then flows into oxidizing gas channels 230. Since the flow rate of oxidizing gas in first distribution space 212 becomes uniform in the direction perpendicular to the longitudinal axis of oxidizing gas channels 230 as described above, the flow rate of oxidizing gas can be equalized among all oxidizing gas channels 230.

Figure 13:
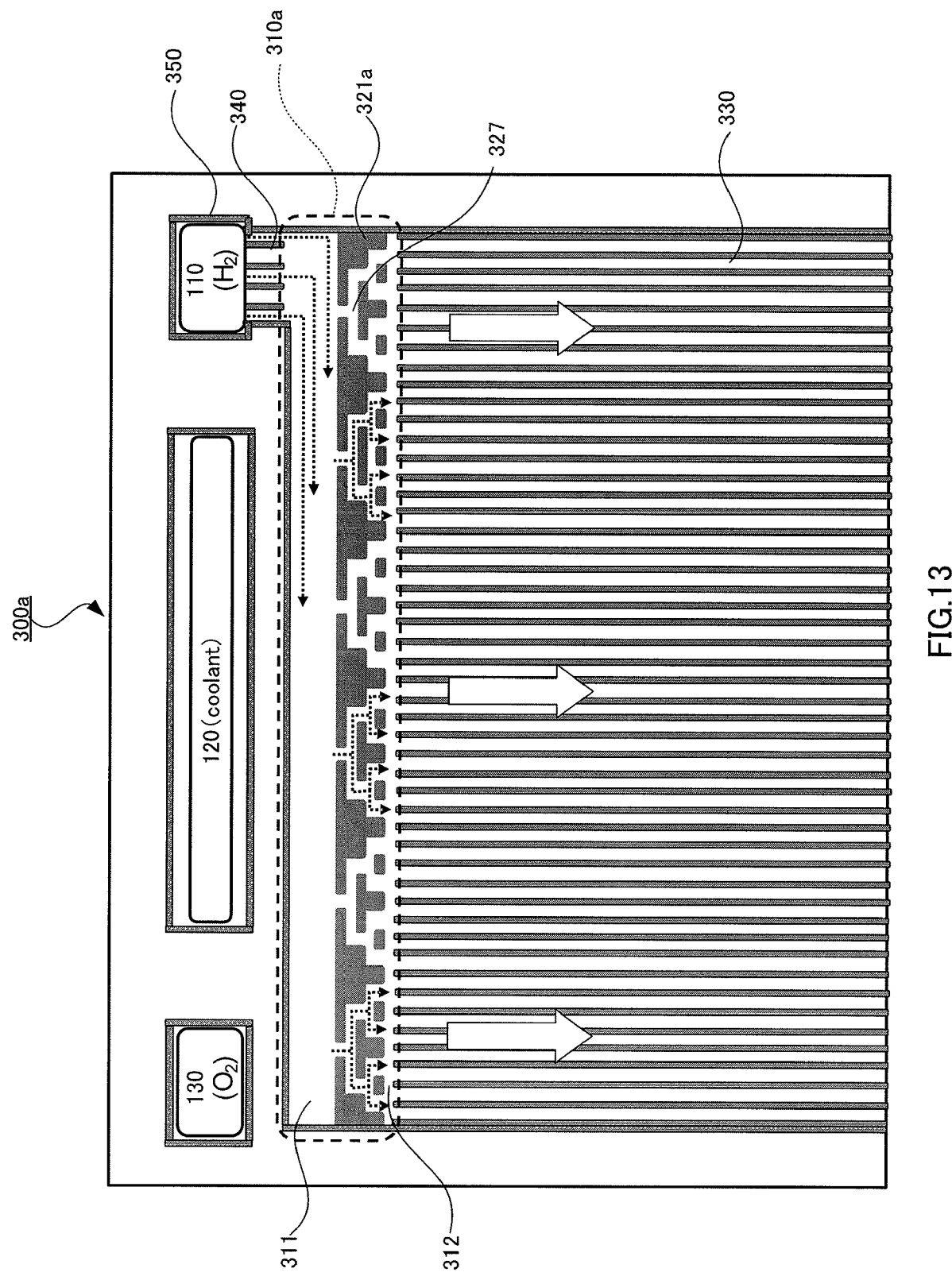
FIG. 13 illustrates a pattern of an inlet fuel gas distribution section of Embodiment 5.

2) Structure of Inlet Fuel Gas Distribution Section 310a of Fuel Electrode Separator 300a FIG. 13 illustrates patterns of inlet fuel gas distribution section 310a and fuel gas channels 330 formed on the surface of fuel electrode separator 300a, which surface contacts MEA. The same components as those of the fuel electrode separator of Embodiment 1 are given the same reference signs and descriptions are not given.

As illustrated in a FIG. 13, inlet fuel gas distribution section 310a connects fuel gas supply manifold hole 110 and linear fuel gas channels 330. Fuel gas supply manifold hole 110 and inlet fuel gas distribution section 310a are connected via channel connection section 340.

Inlet fuel gas distribution section 310a includes one distribution rib 321a whose longitudinal axis is perpendicular to the longitudinal axis of fuel gas channel 330. Distribution rib 321a partitions inlet fuel gas distribution section 310a into two spaces: diffusion space 311 on fuel gas supply manifold hole 110 side, and distribution space 312 on fuel gas channel 330 side.

Distribution rib 321a includes two or more (six) distribution channels 327 which connect diffusion space 311 and distribution space 312. Each distribution channel 327 is branched like a tournament table, beginning from fuel gas supply manifold hole 110 side to fuel gas channel 330 side. Preferably, all distribution channels 327 have the same dimension.

As illustrated in FIG. 13, since the structure of inlet fuel gas distribution section 310a is identical to that of inlet oxidizing gas distribution section 110a of FIG. 11, descriptions of the structure are not given.

Embodiment 6

Embodiment 6 describes a fuel cell in which distribution ribs of the fuel gas distribution section are formed on a frame to be attached to MEA.

Figure 14:
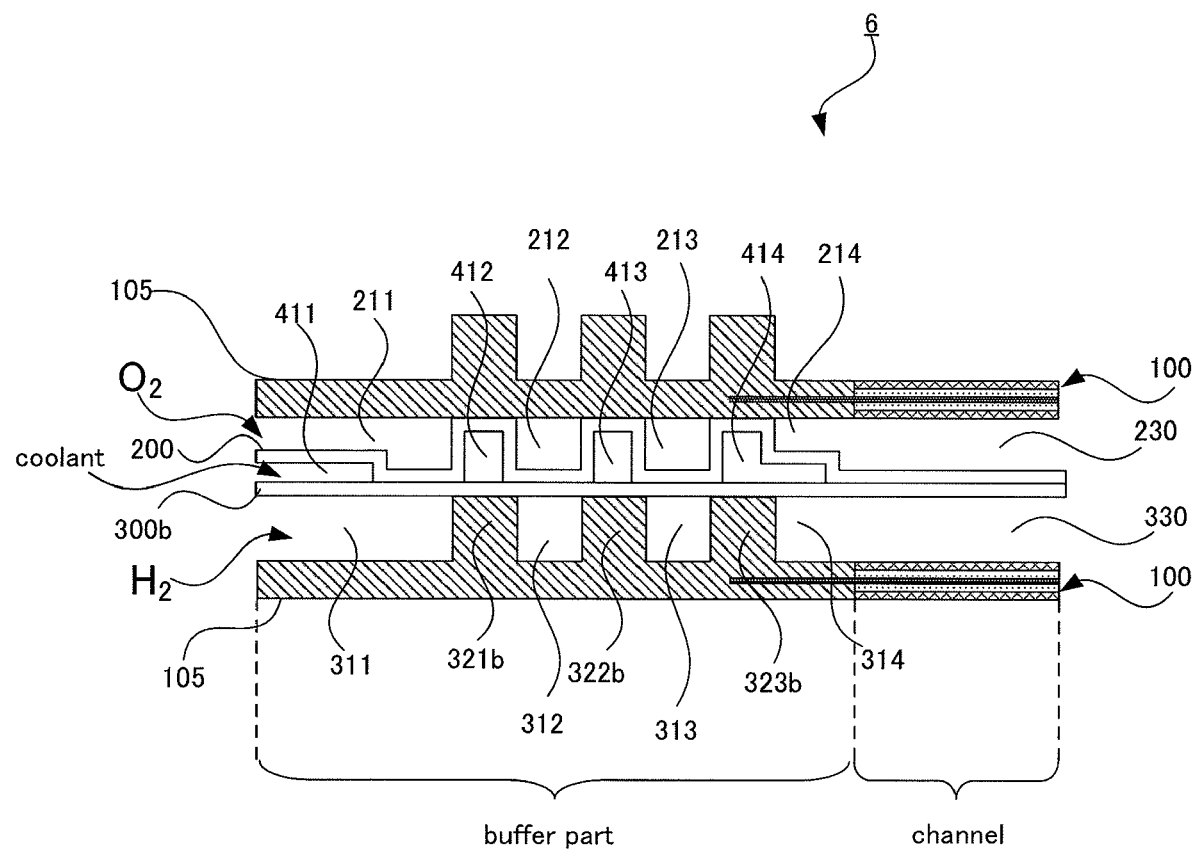
FIG. 14 is a sectional view of the fuel cell of Embodiment 6.

FIG. 14 is a sectional view of fuel cell stack 6 of Embodiment 6. The same components as those in Embodiment 1 are given the same reference signs and descriptions are not given.

As illustrated in FIG. 14, in this embodiment, distribution ribs (first distribution rib 321b, second distribution rib 322b, and third distribution rib 323b) of an inlet fuel gas distribution section are formed on frame 105 of frame-integrated MEA 100. Thus, fuel electrode separator 300b has a flat peripheral part free from any convex or concave portion.

On the other hand, distribution ribs of an inlet oxidizing gas distribution section is formed by stamping of the peripheral part of air electrode separator 200, a metallic separator, as in Embodiment 3. An inlet coolant distribution section is formed by bonding together air electrode separator 200 and fuel electrode separator 300b.

By forming distribution ribs of an inlet fuel gas distribution section on a frame for MEA, the fuel electrode separator becomes flat at the peripheral part, thus simplifying the concavo-convex pattern of the fuel electrode separator. This prevents deformation of the fuel electrode separator.

Embodiment 7

Embodiment 7 describes a fuel cell in which distribution ribs of the oxidizing gas distribution section and fuel gas distribution section are formed on a frame.

Figure 15:
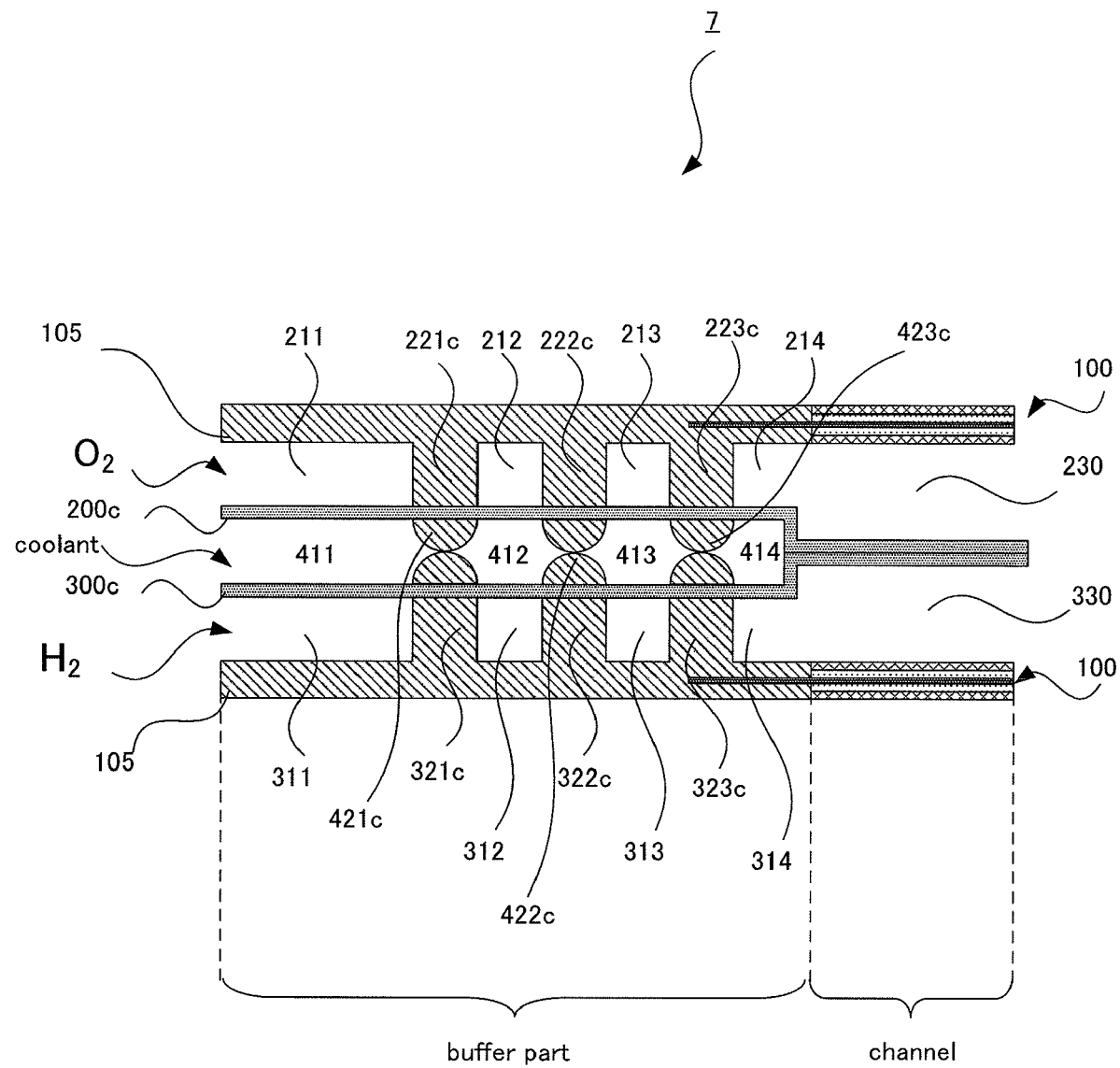
FIG. 15 is a sectional view of the fuel cell of Embodiment 7.

FIG. 15 is a sectional view of fuel cell stack 7 of Embodiment 7. The same components as those in Embodiment 6 are given the same reference signs and descriptions are not given.

As illustrated in FIG. 15, in this embodiment, distribution ribs of both of the inlet oxidizing gas distribution section and inlet fuel gas distribution section are formed on frame 105 of frame-integrated MEA 100. More specifically, distribution ribs of the inlet oxidizing gas distribution section (first distribution rib 221c, second distribution rib 222c, and third distribution rib 223c) are formed on frame 105, and similarly, distribution ribs of the inlet fuel gas distribution section (first distribution rib 321c, second distribution rib 322c, and third distribution rib 323c) are formed on frame 105. Thus, separators (200c, 300c) both have a flat peripheral part free from any convex or concave portion.

When separators (200c, 300c) have a flat peripheral part, simplifying bonding together air electrode separator 200c and fuel electrode separator 300c does not result in the formation of a coolant distribution section unlike Embodiment 1 (see FIGS. 6A to 6D). For this reason, in this embodiment, distribution ribs (first distribution rib 421c, second distribution rib 422c, and third distribution rib 423c) of the inlet coolant distribution section are composed of a sealing member disposed on the peripheral part (flat region) of the separators.

By forming distribution ribs of the inlet fuel gas distribution section and inlet oxidizing gas distribution section on a frame in this way, it is possible to simplify the concavo-convex pattern of both of the air electrode separator and fuel electrode separator. Thus, in this embodiment, deformation of the air electrode separator and fuel electrode separator can be effectively prevented.

Embodiment 8

Embodiment 8 describes an example in which reaction gas channels are formed in a gas diffusion layer.

Figure 16:
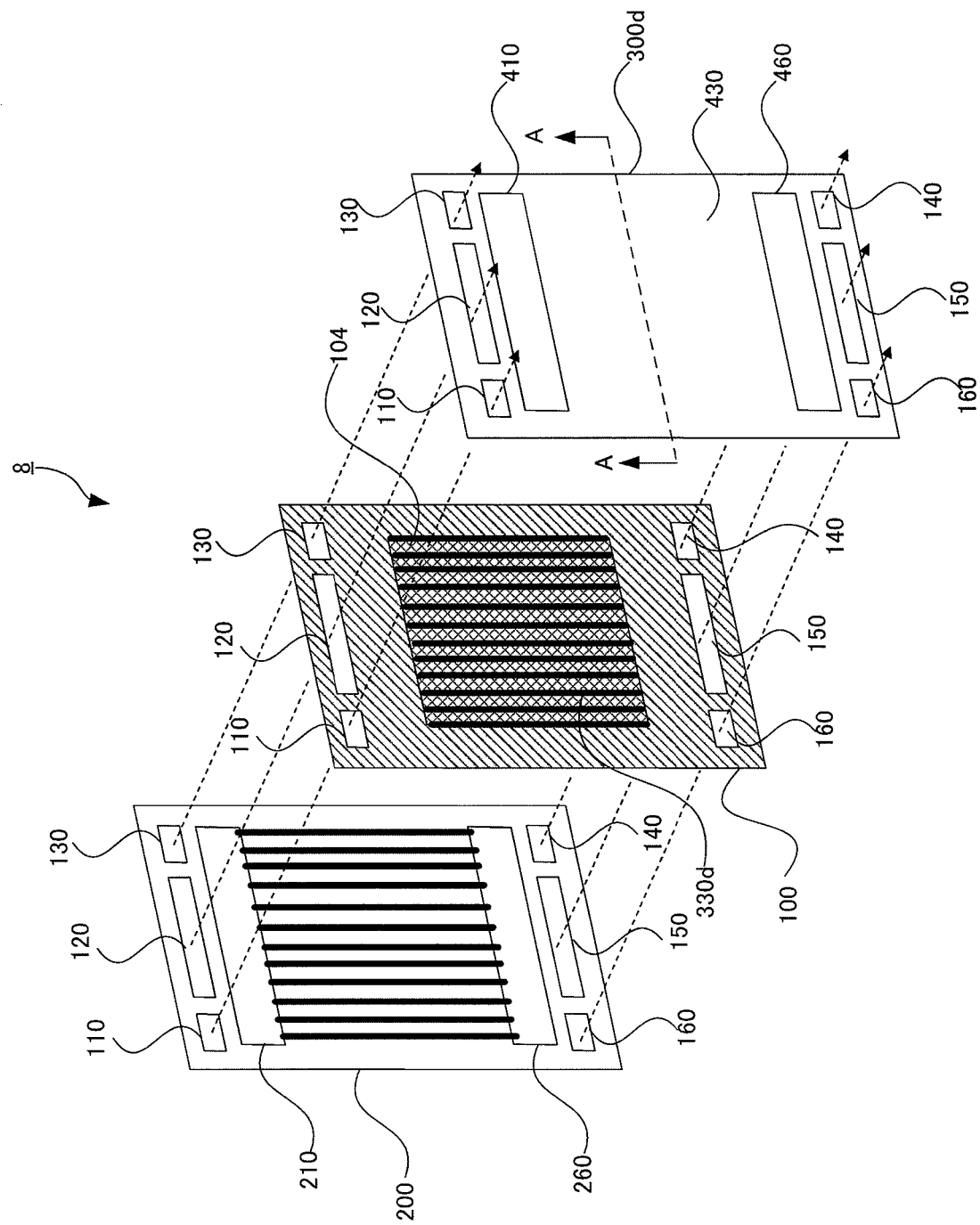
FIG. 16 is an exploded perspective view of the fuel cell of Embodiment 8.

FIG. 16 is an exploded perspective view of a fuel cell of Embodiment 8. The same components as those in Embodiment 1 are given the same reference signs and descriptions are not given. As illustrated in FIG. 16, fuel electrode separator 300d has no fuel gas channels.

Figure 17:
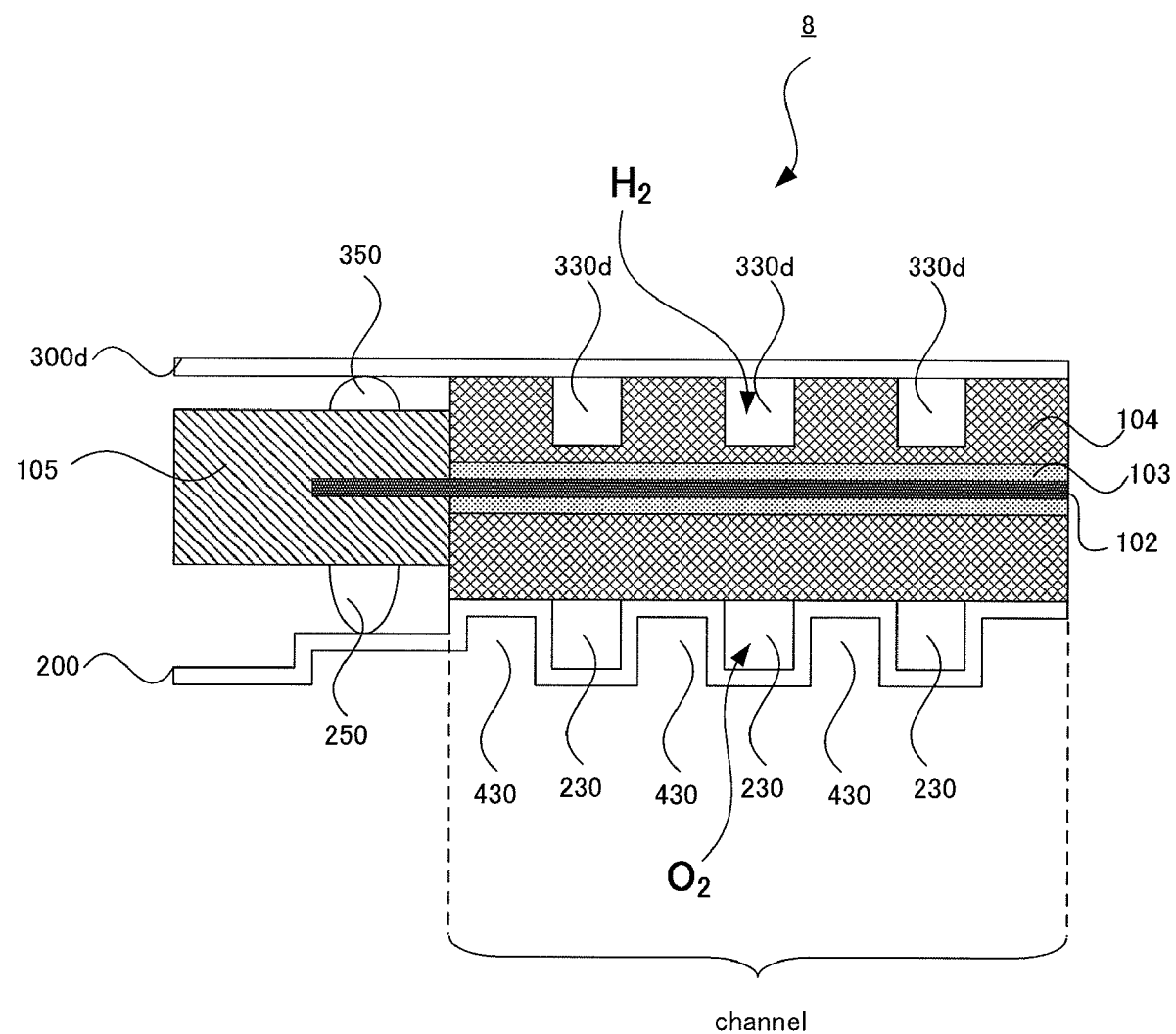
FIG. 17 is a sectional view of the fuel cell of Embodiment 8.

FIG. 17 is a partial enlarged view of fuel cell 5 illustrated in FIG. 16, taken along line AA. The same components as those in Embodiment 1 are given the same reference signs and descriptions are not given.

As illustrated in FIG. 17, fuel gas channels 330d are formed in gas diffusion layer 104 of MEA 101. Thus, fuel electrode separator 300d has a flat central part free from any convex or concave portion.

Experimental Example 1

Simulations are conducted to demonstrate that distribution performance of reaction gas improves according to the present invention. More specifically, using PEM module of FLUENT software (from ANSYS), gas flow in the fuel cell of Embodiment 1 during power generation is analyzed.

The following describes simulation parameters. Catalyst electrode size is 120 mm in width and 200 mm in length. Oxidizing gas channel 230 is 1.0 mm in width and 0.3 mm in depth; total channel count is 48. Distribution ribs defining the oxidizing gas channels are 1.5 mm in width such that the channel pitch is 2.5 mm. Fuel gas channel 330 is 1.0 mm in width and 0.5 mm in depth; total channel count is 48. Distribution ribs defining the fuel gas channels are 1.5 mm in width such that the channel pitch is 2.5 mm. The oxidizing gas channels and fuel gas channels are arranged so that they face each other.

Inlet oxidizing gas distribution section 210 includes four distribution spaces and three distribution ribs. Diffusion space 211 is 10 mm in width and 0.5 mm in depth. First distribution space 212 and second distribution space 213 are 1 mm in width and 0.5 mm in depth. Third distribution space 214 is 3.5 mm in width and 0.5 mm in depth. All of the distribution ribs are 1.5 mm in width. Slits of first distribution rib 221 are 3 mm in width. Slits of second distribution rib 222 and third distribution rib 223 are 1.5 mm in width.

Inlet fuel gas distribution section 310 has the same dimension as the oxidizing gas distribution section except that the depth of the distribution spaces is 0.25 mm.

The flow rate of oxidizing gas at the standard state per cell is 1.737 L/min, and the flow rate of fuel gas at the standard state per cell is 0.713 L/min. Dew point of oxidizing gas is 65° C., dew point of fuel gas is 65° C., and cell temperature is 80° C. Air is employed as oxidizing gas, and hydrogen gas mixed with 25 vol % $CO_2$ is employed as fuel gas. Current density during power generation is 0.24 A/cm$^2$.

Comparative Example 1

Simulations of Comparative Example 1 are conducted under the same condition as in Experimental Example except that neither distribution space nor distribution ribs are provided in the distribution section.

(Analysis Result)

Figure 18:
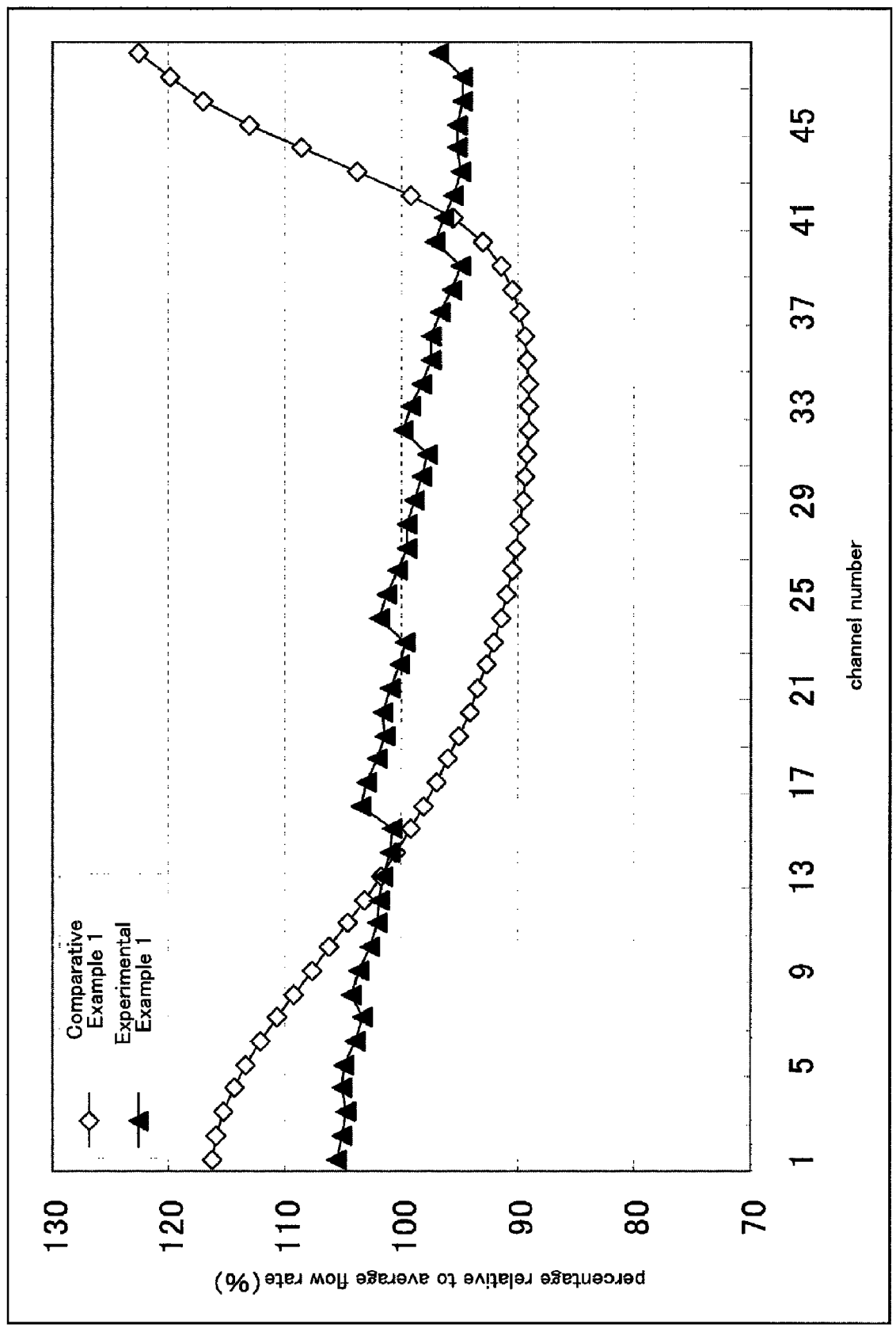
FIG. 18 is a graph showing simulation results of Experimental Example 1 and Comparative Example 1 (air electrode)
Figure 19:
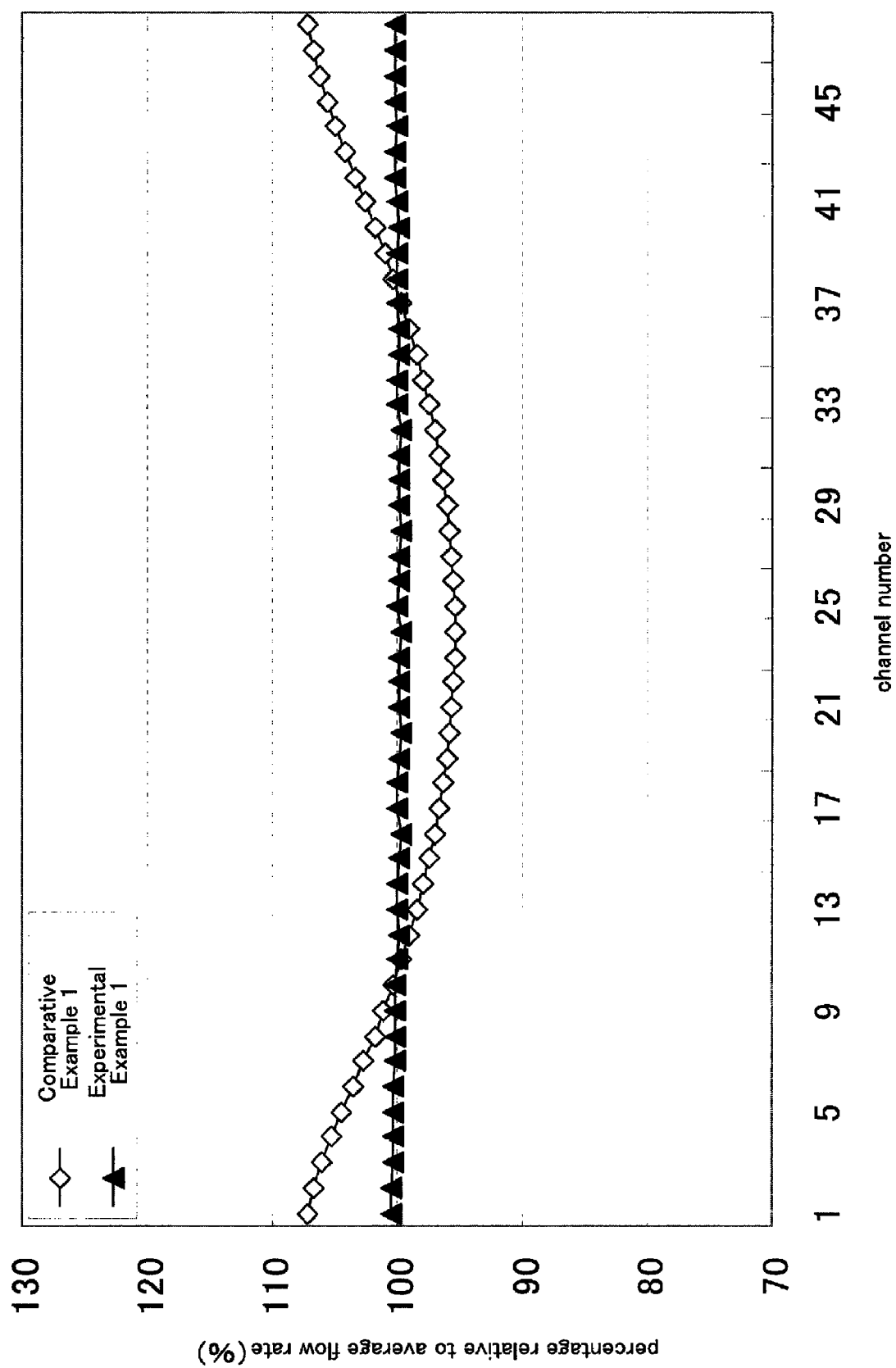
FIG. 19 is a graph showing simulation results of Experimental Example 1 and Comparative Example 1 (fuel electrode)

Analysis results of Experimental Example are given in FIGS. 18 and 19. FIG. 18 shows analysis results of gas flow in oxidizing gas channels, and FIG. 19 shows analysis results of gas flow in fuel gas channels. In FIGS. 18 and 19, the longitudinal axis represents flow rate as a percentage relative to the average flow rate, and the horizontal axis represents channel number.

Average flow rate is a value obtained by dividing the total flow rate by the number of reaction gas channels. When the flow rate in a certain reaction gas channel is 100% of the average flow rate, that means that the flow rate in that reaction gas channel is equal to the average flow rate; when the flow rate exceeds 100%, that means that the flow rate in the reaction gas channel is greater than the average flow rate; and when the flow rate is less than 100%, that means that the flow rate in the reaction gas channel is less than the average flow rate.

As seen from FIG. 18, variations in the flow rate of oxidizing gas among oxidizing gas channels are held within 5% in Experimental Example in which the distribution section has distribution spaces and distribution ribs. In Comparative Example, on the other hand, variations in the flow rate among oxidizing gas channels are larger than 30%. Moreover, as seen from FIG. 19, in Experimental Example in which the distribution section has a distribution space and distribution ribs, variations in the flow rate of fuel gas among fuel gas channels are held within 1%. In Comparative Example, on the other hand, variations in the flow rate among fuel gas channels are larger than 10%.

A possible cause that flow rate variations are smaller in the fuel electrode than in the air electrode is ascribed to lower viscosity of the fuel gas than the oxidizing gas.

These results suggest that the present invention can equalize the flow rate of reaction gas among reaction gas channels. As demonstrated in Comparative Example, when the distribution section has no distribution spaces, the reaction gas flowed into the distribution section flows into reaction gas channels without being equally distributed, resulting variations in the flow rate among the reaction gas channels.

Stationary fuel cell stacks for household cogeneration systems require high power generation efficiency. For this reason, in such a fuel cell stack, the flow rate of reaction gas fed to fuel cells is set low so as to increase the availability of the reaction gas for high power generation efficiency. More specifically, the flow rate of oxidizing gas is around 0.1 to 3 L/min and the flow rate of fuel gas is around 0.05 to 1.2 L/min, per unit fuel cell having a catalyst electrode area of 240 $cm^2$. This increases the oxygen availability of oxidizing gas (limit availability) to up to 80%, and the hydrogen availability of fuel gas (limit availability) to up to 95%. When a fuel cell stack for household cogeneration systems is operated under such a condition, current density becomes 0.02 to 0.4 $A/cm^2$.

As described above, in the fuel cell of the present invention, variations in the flow rate of reaction gas at the flow rate of 2 L/min or less can be held within 5%. Thus, the fuel cell of the present invention is particularly suitable as a fuel cell for household cogeneration systems.

Moreover, as described above, when the limit availability of oxygen is 80% and the limit availability of hydrogen is 95%, the current distribution of electrode is equalized even when the flow rate in oxidizing gas channels varied within 5% and the flow rate in fuel gas channels varied within 1%.

Experimental Example 2

Simulations are conducted for indicating the relationship between reaction gas flow rate and reaction gas distribution performance. In Experimental Example 2, simulations are conducted under the same conditions as in Experimental Example 1 except that flow rate of reaction gas varied.

Comparative Example 2

In Comparative Example 2, simulations are conducted under the same conditions as in Experimental Example 2 except that neither distribution spaces nor distribution ribs are provided in the distribution section.

(Analysis Result)

Figure 20:
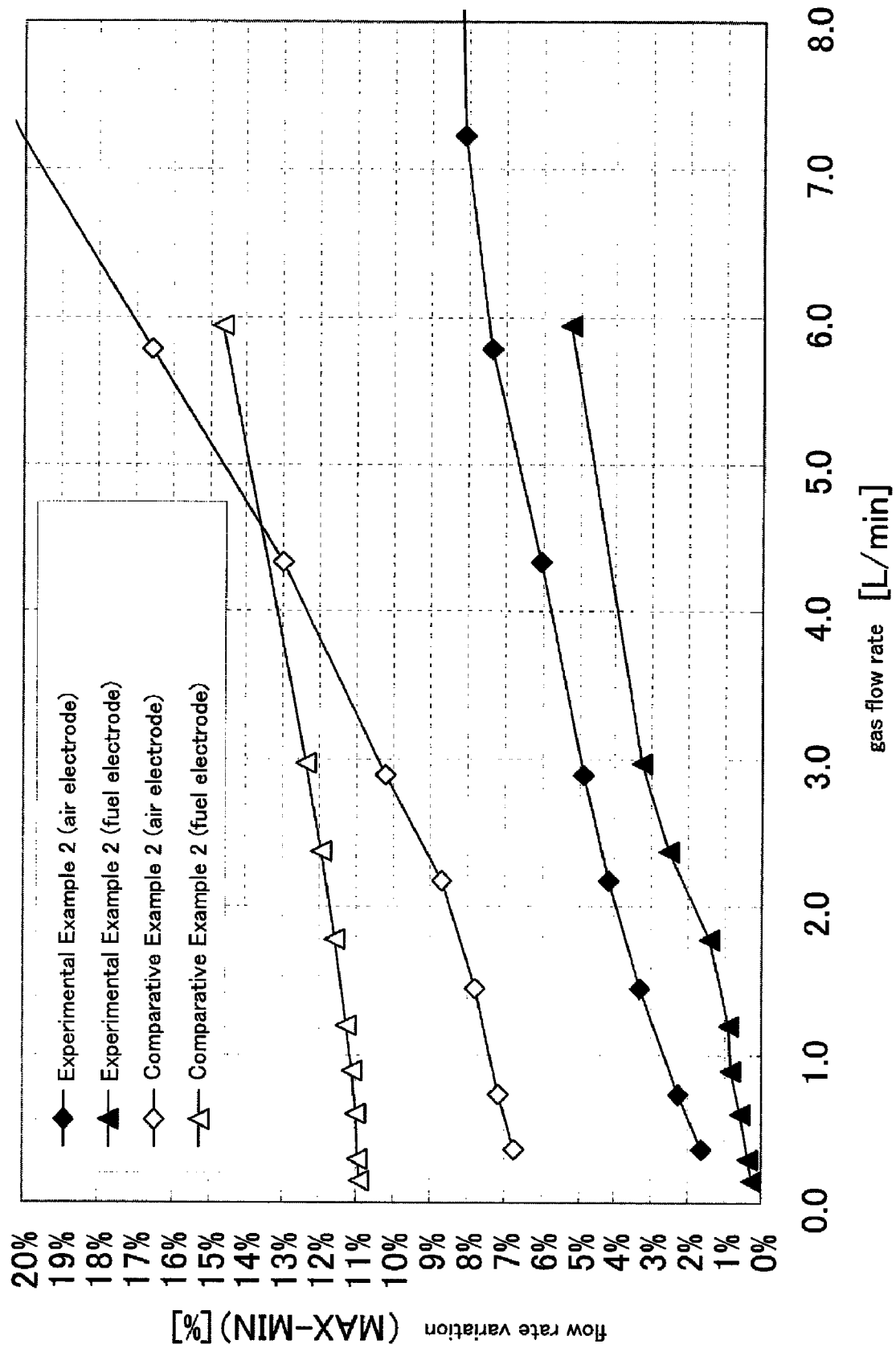
FIG. 20 is a graph showing simulation results of Experimental Example 2 and Comparative Example 2.

Analysis results of Experimental Example 2 and Comparative Example 2 are given in FIG. 20. In FIG. 20, the longitudinal axis represents % flow rate variation, and the horizontal axis represents reaction gas flow rate. Flow rate variation is a value obtained by dividing the difference between a maximum flow rate and a minimum flow rate among reaction gas channels by the average flow rate.

As seen from FIG. 20, in Experimental Example 2 and Comparative Example 2, flow rate variation increases with increasing flow rate. However, flow rate variations in Experimental Example 2 are smaller than those in Comparative Example 2 over the entire flow rate range. More specifically, when the flow rate of oxidizing gas in oxidizing gas channels is 3 L/min, flow rate variations are held within 5%. As to fuel gas channels, even when the flow rate of fuel gas is 1.2 L/min, flow rate variations are held within 1%. In Comparative Example 2 where no distribution spaces are provided in the distribution section, the flow rate variation is 6% at a minimum.

As demonstrated above, the fuel cell of the present invention offers high reaction gas distribution performance even when the flow rate of reaction gas is increased. Thus, the fuel cell of the present invention is suitable as a fuel cell for vehicles, in which the flow rate of reaction gas is high.

In a fuel cell for vehicles, current density during general power generation is 0.5 to 2 $A/cm^2$. To achieve this current density, in a fuel cell for vehicles, oxidizing gas is supplied at a flow rate of 3.5 to 8 L/min, and fuel gas is supplied at a flow rate of 1.4 to 6 L/min per unit fuel cell having a catalyst electrode area of 240 $cm^2$.

This application is entitled and claims the priority of Japanese Patent Application No. 2009-214693 filed on Sep. 16, 2009, and Japanese Patent Application No. 2010-32619 filed on Feb. 17, 2010, the disclosure of each of which including the specification, drawings and abstract is incorporated herein by reference in its entirety.

INDUSTRIAL APPLICABILITY

The fuel cell of the present invention offers high reaction gas distribution performance, and therefore is suitably used in a fuel cell stack for household cogeneration systems. Moreover, the fuel cell of the present invention offers high reaction gas distribution performance even when the flow rate of reaction gas is set high. Thus, the fuel cell also offers high power generation performance when used a fuel cell for electric vehicles or as a mobile fuel cell.

REFERENCE SIGNS LIST 1, 2, 3, 5, 6, 7 Fuel Cell
100 Frame-integrated MEA
101 MEA
105 Frame
102 Electrolyte Membrane
103 Catalyst Layer
104 Gas Diffusion Layer
110 Fuel Gas Supply Manifold Hole
120 Coolant Supply Manifold Hole
130 Oxidizing Gas Supply Manifold Hole
140 Fuel Gas Discharge Manifold Hole
150 Coolant Discharge Manifold Hole
160 Oxidizing Gas Discharge Manifold Hole
170 Elastic Member
200 Air Electrode Separator
210 Inlet Oxidizing Gas Distribution Section
211 Diffusion Space
212, 213, 214 Distribution Space
221, 222, 223 Distribution rib
225, 325, 425 Slit
227, 327 Distribution Channel
230 Oxidizing Gas Channel 231 Channel Rib
240, 340, 440 Channel Connection Section
250, 350, 450 Sealing Member
260 Outlet Oxidizing Gas Distribution Section
300 Fuel Electrode Separator
310 Inlet Fuel Gas Distribution Section
311 Diffusion Space
312, 313, 314 Distribution Space
321, 322, 323 Distribution rib
330 Fuel Gas Channel
331 Channel Rib
360 Outlet Fuel Gas Distribution Section
410 Inlet Coolant Distribution Section
411, 412, 413, 414 Distribution Space
421, 422, 423 Distribution Rib
430 Coolant Channel
431 Channel Rib
460 Outlet Coolant Distribution Section

The invention claimed is:

1. A polymer electrolyte fuel cell comprising:
a membrane electrode assembly including a polymer electrolyte membrane and a pair of catalyst electrodes sandwiching the polymer electrolyte membrane;
a pair of separators that sandwich the membrane electrode assembly, the separators each including linear reaction gas channels defined by linear channel ribs, a reaction gas supply manifold hole, and a reaction gas discharge manifold hole; and
an inlet gas distributor that connects the reaction gas supply manifold hole and the reaction gas channels, wherein
the inlet gas distributor includes n distribution ribs for partitioning the inlet gas distributor into a plurality of spaces, n being an integer equal to or greater than 2, the distribution ribs each having a longitudinal axis perpendicular to a longitudinal axis of the linear reaction gas channels, the distribution ribs each having at least two slits provided therein, the slits extending in parallel to the longitudinal axis of the linear reaction channels,
when, of the distribution ribs, a distribution rib positioned closest to the reaction gas supply manifold hole is considered a first distribution rib and the distribution rib positioned closest to the reaction gas channels an n-th distribution rib, and when, of the spaces, a space positioned between the first distribution rib and the reaction gas supply manifold hole is considered as a diffusion space,
an average of sectional areas of the diffusion space, the sectional areas taken along the longitudinal axis of the reaction gas channel and along a normal to the surface of the separator, is larger than a sectional area of any of the slits of the first distribution rib, the sectional area taken along the longitudinal axis of the distribution rib and along a normal to the surface of the separator, and
slits of an m-th distribution rib are positioned at midpoints between adjacent slits of an (m+1)-th distribution rib, m being an integer between 1 and n−1.

2. The polymer electrolyte fuel cell according to claim 1, wherein the average of sectional areas of the diffusion space is not less than 0.9 times a sum of sectional areas of the slits of the first distribution rib.

3. The polymer electrolyte fuel cell according to claim 1, wherein the m-th distribution rib has fewer slits than the (m+1)-th distribution rib.

4. The polymer electrolyte fuel cell according to claim 1, wherein the number of the slits of the m-th distribution rib is half the number of the slits of the (m+1)-th distribution rib.

5. The polymer electrolyte fuel cell according to claim 4, wherein the number of the slits of the n-th distribution rib is half the number of the reaction gas channels of the separator.

6. The polymer electrolyte fuel cell according to claim 1, further comprising an outlet gas distributor that connects the reaction gas channels and the reaction gas discharge manifold hole, wherein
the reaction gas discharge manifold hole is diagonally opposite to the reaction gas supply manifold hole, and the position of the reaction gas supply manifold hole is symmetrical to the position of the reaction gas discharge manifold hole about the center point of the separator, and
the position and structure of the inlet gas distributor are respectively symmetrical to the position and structure of the outlet gas distributor about the center point of the separator.

7. The polymer electrolyte fuel cell according to claim 1, further comprising a frame that holds the membrane electrode assembly, wherein the inlet gas distributor is provided between the separator and the frame.

8. The polymer electrolyte fuel cell according to claim 7, wherein a sum of the height of the channel rib and the thickness of the membrane electrode assembly is equal to or greater than a sum of the height of the channel rib and the thickness of the frame, and
the first distribution rib is the highest of all of the distribution ribs.

9. The polymer electrolyte fuel cell according to claim 8, wherein distribution rib height gradually decrease from the first distribution rib toward the n-th distribution rib.

10. The polymer electrolyte fuel cell according to claim 7, wherein a top of the distribution ribs is made of an elastic member.

11. The polymer electrolyte fuel cell according to claim 1, wherein when the plurality of spaces other than the diffusion space are considered as distribution spaces, an average of sectional areas of the diffusion space is larger than an average of sectional areas of any of the distribution spaces, the sectional areas taken along the longitudinal axis of the reaction gas channel and along the normal to the surface of the separator.

12. The polymer electrolyte fuel cell according to claim 1, wherein the separator includes a coolant supply manifold hole and linear coolant channels, the linear coolant channels formed on a rear surface opposite to a surface provided with the reaction gas channels, and
the coolant supply manifold hole is adjacent to the reaction gas supply manifold hole.

13. The polymer electrolyte fuel cell according to claim 12, further comprising an inlet coolant distributor that connects the coolant supply manifold hole and the coolant channels, wherein
the inlet coolant distributor includes n distribution ribs for partitioning the inlet coolant distributor into a plurality of spaces, n being an integer equal to or greater than 2, the distribution ribs each having a longitudinal axis perpendicular to a longitudinal axis of the linear coolant channels, the distribution ribs each having two or more slits provided therein, the slits being parallel to the longitudinal axis of the linear coolant channels.

14. The polymer electrolyte fuel cell according to claim 1, wherein the distribution ribs of the inlet gas distributor are formed on the separator.

15. The polymer electrolyte fuel cell according to claim 7, wherein the separator includes a central part provided with the reaction gas channels, and a peripheral part surrounding the central part,
the distribution ribs of the inlet gas distribution section are formed on the frame, and the peripheral part is flat.

* * * * *